(12) United States Patent
Kondo

(10) Patent No.: US 7,532,888 B2
(45) Date of Patent: May 12, 2009

(54) CDMA MOBILE COMMUNICATION SYSTEM, BASE STATION, MOBILE STATION AND COMMUNICATION CONTROL METHOD DURING SOFT HANDOVER

(75) Inventor: Takayuki Kondo, Tokyo (JP)

(73) Assignee: Nec Corporation, Tokyo (JP)

( * ) Notice: Subject to any disclaimer, the term of this patent is extended or adjusted under 35 U.S.C. 154(b) by 1229 days.

(21) Appl. No.: 10/307,359

(22) Filed: Dec. 2, 2002

(65) Prior Publication Data

US 2003/0076796 A1 Apr. 24, 2003

Related U.S. Application Data

(63) Continuation of application No. 09/372,053, filed on Aug. 11, 1999, now Pat. No. 6,526,028.

(30) Foreign Application Priority Data

Aug. 12, 1998 (JP) .............................. 1998/228144

(51) Int. Cl.
*G06F 15/16* (2006.01)
(52) U.S. Cl. ...................... 455/442; 370/332
(58) Field of Classification Search .................. 455/69, 455/436–439, 442, 452.2, 522; 370/320, 370/332, 335, 342
See application file for complete search history.

(56) References Cited

U.S. PATENT DOCUMENTS

| | | | |
|---|---|---|---|
| 4,556,760 A * | 12/1985 | Goldman | ..................... 455/436 |
| 5,574,984 A | 11/1996 | Reed et al. | |
| 5,771,451 A | 6/1998 | Takai et al. | |
| 5,987,326 A | 11/1999 | Tiedemann, Jr. et al. | |
| 6,073,025 A | 6/2000 | Chheda et al. | |
| 6,141,555 A * | 10/2000 | Sato | ............................ 455/437 |
| 6,175,745 B1 * | 1/2001 | Bringby et al. | .............. 455/522 |
| 6,307,849 B1 | 10/2001 | Tiedemann, Jr. | |

(Continued)

FOREIGN PATENT DOCUMENTS

EP 0 884 918 A2 12/1998

(Continued)

OTHER PUBLICATIONS

H. Furukawa, "Site Selection Transmit Power Control in DS-CDMA Down-Link", C&C Media Research Laboratories, B-5-118, Mar. 1998, pp. 482.

(Continued)

*Primary Examiner*—Sam Bhattacharya
(74) *Attorney, Agent, or Firm*—Sughrue Mion, PLLC

(57) ABSTRACT

In a CDMA mobile communication system comprising a plurality of base stations and a mobile station for making possible to communicate with said base stations by a soft handover, forward transmission between the mobile station and a particular base station is carried out when fading is small. When the fading is large, forward transmission between the mobile station and at least two base stations including the particular base station is carried out. The particular base station has a minimum propagation loss. When the fading is small, other base stations except for the particular base station turns the forward transmission off. Alternatively, the other base stations except for the particular base station lowers transmission power for the forward transmission when the fading is small.

6 Claims, 29 Drawing Sheets

U.S. PATENT DOCUMENTS

| | | | |
|---|---|---|---|
| 6,351,642 B1 * | 2/2002 | Corbett et al. | 455/442 |
| 6,389,296 B1 * | 5/2002 | Shiraki et al. | 455/522 |
| 2001/0000168 A1 * | 4/2001 | Esmailzadeh et al. | 455/522 |

FOREIGN PATENT DOCUMENTS

| | | |
|---|---|---|
| JP | 06-13956 A | 1/1994 |
| JP | 08-172390 A | 7/1996 |
| JP | 08-256102 A | 10/1996 |
| JP | 09-261725 A | 10/1997 |
| WO | WO 96/08119 A2 | 3/1996 |
| WO | 97/44983 A2 | 11/1997 |
| WO | 98/33288 A2 | 7/1998 |
| WO | WO 98/35525 A2 | 8/1998 |

OTHER PUBLICATIONS

T. Moorti et al., "Performance of a Fixed-Beam System in the IS-95 CDMA Forward Link," *European Transaction on Telecommunications*, vol. 9, No. 4, Jul.-Aug. 1998, pp. 361-370.

T. Andersson, "Tuning the Macro Diversity Performance in a DS-CDMA System", *Vehicular Technology Conference, IEEE*, 1994, pp. 41-45.

* cited by examiner

FIG.11C TARGET Eb/Io LEVEL  VARIANCE: LARGE

FIG.12C TARGET Eb/Io LEVEL  VARIANCE: SMALL $a_1, \quad a_2, \quad a_3, \quad a_4, \quad a_5, \quad a_6, \quad a_7, \quad a_8, \quad a_9, \quad \cdots$

AVERAGE

AVERAGE

AVERAGE

| | 1st EMBODIMENT | 2nd EMBODIMENT | 3rd EMBODIMENT | 4th EMBODIMENT |
|---|---|---|---|---|
| MAGNITUDE OF FADING | MOBILE STATION MEASURES FROM FORWARD LINK | BASE STATION MEASURES FROM REVERSE LINK | MOBILE STATION MEASURES FROM FORWARD LINK | BASE STATION MEASURES FROM REVERSE LINK |
| MINIMUM PROPAGATION LOSS BASE STATION | MOBILE STATION MEASURES FROM PERCH CHANNELS | THE SAME AS LEFT | BASE STATION MEASURES FROM RECEIVED POWER ON REVERSE LINK | THE SAME AS LEFT |

FIG.30

CDMA MOBILE COMMUNICATION SYSTEM, BASE STATION, MOBILE STATION AND COMMUNICATION CONTROL METHOD DURING SOFT HANDOVER

This is a continuation of Application No. 09/372,053, filed Aug. 11, 1999; now U.S. Pat. No. 6,526,028 the disclosure of which is incorporated herein by reference.

BACKGROUND OF THE INVENTION

This invention relates to a code division multiple access (CDMA) mobile communication system comprising a mobile station, a base station, a base station control apparatus, and an exchange station and, in particular, to a forward transmission power control method in the CDMA mobile communication system.

In recent years, as a communication system for use in a mobile communication system, attention is directed to a time division multiple access (CDMA) communication system which is not affected by interference and interruption. The CDMA communication system is a communication system in which a transmitting side spreads a user signal to be transmitted using a transmission spreading code to transmit a spread signal and a receiving side despreads the spread signal using a reception spreading code identical with the transmission spreading code to obtain an original user signal.

In addition, in the CDMA mobile communication system, a plurality of transmitting sides carry out spreading operations using different transmission spreading codes having orthogonality, respectively, and the receiving side can carry out identification of each communication by selecting, as the reception spreading code, one of the transmission spreading codes to be used on carrying out despreading operation. Accordingly, it is possible to use the same frequency band in a plurality of communications.

However, it is difficult to perfectly maintain the orthogonality among all of the spreading codes to be used. In actually, the respective spreading codes are not perfectly orthogonal to one another and then each spreading code has a correlation component with respect to other spreading codes. As a result, the correlation component serves as an interference component in its own communication and it results in a degradation factor in communication quality. Inasmuch as the interference component occurs due to such a degradation factor, the larger the number of communications becomes, the larger interference components becomes. As a result, it is possible to increase the number of communication channels enable to multiplex in a frequency band if each communication channel has a low transmission power.

As a result, each base station in the CDMA mobile communication system carries out control of transmission power for each mobile station so that each of received bit energy-to-interference ratios Eb/I0 (which are ratios of desired received wave powers (Eb) to interference wave powers (I0)) obtained by communication channels established between the base station and the respective mobile stations is equal to a necessary power ratio Eb/I0 required to insure the minimum communication quality. This transmission power control is called a reverse transmission power control.

Specifically, a transmission power control (TPC) information signal for instructing up/down of transmission power for the mobile station is included in a forward signal which is transmitted from the base station to the mobile station via a forward link. By using the TRC information signal, the base station carries out an up instruction or a down instruction of a current transmission power for each mobile station.

In the above-mentioned CDMA mobile communication system, each base station covers a cell which is a area where the base station can communicate with the mobile station. In addition, the mobile station moves with a communication channel established between the mobile station and a base station. When the mobile station goes out of the cell covered by the base station, the mobile station must carry out a handover for establishing a new communication channel with another base station which cover a cell where the mobile station moves.

The mobile communication system adopting a spread spectrum system carries out a soft handover in order to maintain a service quality by avoiding a momentary interruption or the like on carrying out the handover between the base stations. The soft handover is the handover where the mobile station simultaneously carries out communication with a plurality of base stations and is a peculiar function to the spread spectrum communication which can use the same radio frequency.

However, inasmuch as the same information signal is transmitted from the plurality of base stations to the mobile station when the soft handover is carried out, transmission power in the forward link per communication is much. As a result, interference power affecting other communications increases and it results in a restriction of a communication capacity.

In order to improve such a restriction, for instance, a method of decreasing transmission power in the forward link per communication by carrying out forward transmission from only one base station having a minimum propagation loss on the soft handover is disclosed in an article contributed by Furukawa (NEC Corporation) to the Communication Society Conf., IEICE, B-5-118, March 1998.

However, it is impossible for this conventional forward transmission power control method to secure a user quality in a case where there is a large fading in a communication channel. This is because the forward transmission is always carried out from only one base station on the soft handover.

In a multimedia communication, prediction is made that a transmission rate where a large capacity of data is transmitted from a data base at a network side to the mobile station is large. When the rate of the multimedia is large in future, it is necessary to increase a radio channel capacity of the forward link in comparison with that of the reverse link. As a result, it is necessary to decrease the transmission power of the forward link.

In addition, as regards the reverse link which is a communication channel from the mobile station to the base station, one transmission is always carried out per communication and an effect of the soft handover is obtained by receiving in a plurality of base stations. Accordingly, the problem of increasing the transmission power does not arise on carrying out the soft handover.

At any rate, the above-mentioned conventional CDMA mobile communication system is disadvantageous in that the communication capacity of the forward link is restricted on carrying out the soft handover. This is because the transmission power of the forward link per communication increases and interference power affecting other communications increases.

In addition, various other CDMA mobile communication systems related to the present invention are already known. By way of example, Japanese Unexamined Patent Publication of Tokkai No. Hei 8-172,390 or JP-A 9-172390 discloses a mobile communication system which is capable of reducing the influence of fading by selecting a plurality of base stations the reception powers from which at a mobile station exceed a prescribed value and simultaneously transmitting signals from these base stations to the mobile station with different frequencies and subjecting them to diversity synthesis. According to JP-A 8-172390, transmitted from a mobile station, a signal is received by first and second base stations, and a control station performs diversity synthesis. Transmitted from the first and the second base stations, signals are received by the mobile station and are subjected to diversity synthesis. When the mobile station moves to a point in the vicinity of the boundary of a first radio zone for the first base station and the reception power from the first base station is reduced to the prescribed value or smaller, communication with the first base station is switched to a third base station which the reception power from is larger. When the mobile station moves a point in a second radio zone for the second base station and the reception power from the second base station is reduced to the prescribed value or smaller, communication with the second base station is switched to that with a fourth base station which the reception power from is larger. In the similar manner, communication with the third base station is switched to that with a fifth base station at a point in the vicinity of the boundary of a third radio zone for the third base station.

Japanese Unexamined Patent Publication of Tokkai No. Hei 6-13,956 or JP-A 6-013956 discloses a transmission power controller in a mobile communication and its system which are capable of increasing the capacity of the system by implementing accurate transmission power control at a mobile station side. According to JP-A 6-013956, a control processor detects received power and the reception power is calculated from a strength of a pilot signal fed from a searcher receiver in this case. Thus, the signal strength of a transmission signal from a base station from which a mobile station is communicated is accurately detected. Furthermore, a fading speed is estimated from a change in the received power thereby controlling an averaging time in a transmission power controller. Thus, the system copes even with a change in the fading speed and the optimum averaging time is always obtained. Then an electric field median strength is always detected without causing a response delay and accurate transmission power control is attained.

SUMMARY OF THE INVENTION

It is therefore an object of the present invention to provide a CDMA mobile communication system which is capable of decreasing a communication capacity in a forward link without degradation of a service quality in a communication channel when a soft handover is carried out.

Other objects of this invention will become clear as the description proceeds.

According to an aspect of this invention, a method is for controlling communication in a code division multiple access (CDMA) mobile communication system comprising a plurality of base stations and a mobile station for making possible to communicate with the base stations by a soft handover. The method comprises the steps of carrying out forward transmission between the mobile station and a particular base station when fading is small, and of carrying out forward transmission between the mobile station and at least two base stations including the particular base station when the fading is large.

According to an aspect of this invention, a method is for of controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine a particular base station having a minimum propagation loss, of measuring, in the mobile station, magnitude of fading in the communication channels to produce a determined result indicative of whether or not the magnitude of the fading has a value which is larger than a predetermined threshold value, of transmitting, from the mobile station to the base stations via a reverse link, as a forward transmission power information signal, a combination of a base station information signal indicative of the particular base station, a fading information signal indicative of the determined result, and an error detection information signal for carrying out error detection of the base station information signal and the fading information signal, of decoding, in each of the base stations, the forward transmission power information signal to carry out the error detection on the fading information signal and the base station information signal using the error detection information signal, of turning, in each of the base stations, a forward transmission off when an error is not detected in the error detection, when the fading information signal indicates that the value of the magnitude of the fading is smaller than the predetermined threshold value, and when its own base station does not correspond to the particular base station indicated by the base station information signal, and otherwise of turning, in each of the base stations, the forward transmission on.

According to another aspect of this invention, a method is for controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine a particular base station having a minimum propagation loss, of transmitting, from the mobile station to the base stations via a reverse link, as a forward transmission power information signal, a combination of a base station information signal indicative of the particular base station and an error detection information signal for carrying out error detection of the base station information signal, of decoding, in each of tie base stations, the forward transmission power information signal to carry out the error detection on the base station information signal using the error detection information signal, of determining, in each of the base stations, whether or not magnitude of fading on the reverse link has a value which is larger than a predetermined threshold value, of turning, in each of the base stations, a forward transmission off when an error is not detected in the error detection, when the value of the magnitude of the fading is smaller than the predetermined threshold value, and when its own base station does not correspond to the particular base station indicated by the base station information signal, and otherwise of turning, in each of the base stations, the forward transmission on.

According to sill another aspect of this invention, a method is for controlling communication in a code division multiple access (CDMA) mobile communication system comprising a plurality of base stations, a base station control apparatus connected to the base stations, and a mobile station for making possible to communicate with the base stations via respective communication channels by a soft handover. The method comprises the steps of measuring, in the mobile station, magnitude of fading in the communication channels to produce a determined result indicative of whether or not the magnitude of the fading has a value which is larger than a predetermined threshold value, of transmitting, from the mobile station to the base stations via a reverse link, as a forward transmission power information signal, a combination of a fading information signal indicative of the determined result and an error detection information signal for carrying out error detection of the fading information signal, of decoding, in each of the base stations, the forward transmission power information signal to carry out the error detection on the fading information signal using the error detection information signal, of comparing, in the base station control apparatus, bit energy-to-interference ratios of the base stations in the respective communication channels to determine, as a particular base station, one of the base stations that has a maximum bit energy-to-interference ratio, of sending, from the base station control apparatus to the base stations, a base station information signal indicative of the particular base station, of turning, in each of the base stations, a forward transmission off when an error is not detected in the error detection, when the fading information signal indicates that the value of the magnitude of the fading is smaller than the predetermined threshold value, and when its own base station does not correspond to the particular base station indicated by the base station information signal, and otherwise of turning, in each of the base stations, the forward transmission on.

According to yet another aspect of this invention, a method is for controlling communication in a code division multiple access (CDMA) mobile communication system comprising a plurality of base stations, a base station control apparatus connected to the base stations, and a mobile station for making possible to communicate with the base stations via respective communication channels by a soft handover. The method comprising the steps of determining, in each of the base stations, whether or not magnitude of fading on a reverse link has a value which is larger than a predetermined threshold value, of comparing, in the base station control apparatus, bit energy-to-interference ratios of the base stations in the respective communication channels to determine, as a particular base station, one of the base stations that has a maximum bit energy-to-interference ratio, of sending, from the base station control apparatus to the base stations, a base station information signal indicative of the particular base station, of turning, in each of the base stations, a forward transmission off when the value of the magnitude of the fading is smaller than the predetermined threshold value and when its own base station does not correspond to the particular base station indicated by the base station information signal, and otherwise of turning, in each of the base stations, the forward transmission on.

According to an aspect of this invention, a method is for controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine at least one specific base station in which forward transmission should be turned on in accordance with a predetermined reference value, of measuring, in the mobile station, magnitude of fading in the communication channels to produce a determined result indicative of whether or not the magnitude of the fading has a value which is larger than a predetermined threshold value, of transmitting, from the mobile station to the base stations via a reverse link, as a forward transmission power information signal, a combination of a base station information signal indicative of the at least one specific base station, a fading information signal indicative of the determined result, and an error detection information signal for carrying out error detection of the base station information signal and the fading information signal, of decoding, in each of the base stations, the forward transmission power information signal to carry out the error detection on the fading information signal and the base station information signal using the error detection information signal, of turning, in each of the base stations, a forward transmission off when an error is not detected in the error detection, when the fading information signal indicates that the value of the magnitude of the fading is smaller than the predetermined threshold value, and when its own base station does not correspond to the at least one specific base station indicated by the base station information signal, and otherwise of turning, in each of the base stations, the forward transmission on.

According to another aspect of this invention, a method is for controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine at least one specific base station in which forward transmission should be turned on in accordance with a predetermined reference value, of transmitting, from the mobile station to the base stations via a reverse link, as a forward transmission power information signal, a combination of a base station information signal indicative of the at least one specific base station and an error detection information signal for carrying out error detection of the base station information signal, of decoding, in each of the base stations, the forward transmission power information signal to carry out the error detection on the base station information signal using the error detection information signal, of determining, in each of the base stations, whether or not magnitude of fading on the reverse link has a value which is larger than a predetermined threshold value, of turning, in each of the base stations, a forward transmission off when an error is not detected in the error detection, when the value of the magnitude of the fading is smaller than the predetermined threshold value, and when its own base station does not correspond to the at least one specific base station indicated by the base station information signal, and otherwise of turning, in each of the base stations, the forward transmission on.

According to still another aspect of this invention, a method is for controlling communication in a code division multiple access (CDMA) mobile communication system comprising a plurality of base stations, a base station control apparatus connected to the base stations, and a mobile station for making possible to communicate with the base stations via respective communication channels by a soft handover. The method comprises the steps of measuring, in the mobile station, magnitude of fading in the communication channels to produce a determined result indicative of whether or not the magnitude of the fading has a value which is larger than a predetermined threshold value, of transmitting, from the mobile station to the base stations via a reverse link, as a forward transmission power information signal, a combination of a fading information signal indicative of the determined result and an error detection information signal for carrying out error detection of the fading information signal, of decoding, in each of the base stations, the forward transmission power information signal to carry out the error detection on the fading information signal using the error detection information signal, of comparing, in the base station control apparatus, bit energy-to-interference ratios of the base stations in the respective communication channels to determine at least one specific base station in which forward transmission should be turned on in accordance with a predetermined reference value, of sending, from the base station control apparatus to the base stations, a base station information signal indicative of the at least one specific base station, of turning, in each of the base stations, a forward transmission off when an error is not detected in the error detection, when the fading information signal indicates that the value of the magnitude of the fading is smaller than the predetermined threshold value, and when its own base station does not correspond to the at least one specific base station indicated by the base station information signal, and otherwise of turning, in each of the base stations, the forward transmission on.

According to yet another aspect of this invention, a method is for controlling communication in a code division multiple access (CDMA) mobile communication system comprising a plurality of base stations, a base station control apparatus connected to the base stations, and a mobile station for making possible to communicate with the base stations via respective communication channels by a soft handover. The method comprises the steps of determining, in each of the base stations, whether or not magnitude of fading on a reverse link has a value which is larger than a predetermined threshold value, of comparing, in the base station control apparatus, bit energy-to-interference ratios of the base stations in the respective communication channels to determine at least one specific base station in which forward transmission should be turned on in accordance with a predetermined reference value, of sending, from the base station control apparatus to the base stations, a base station information signal indicative of the at least one specific base station, of turning, in each of the base stations, a forward transmission off when the value of the magnitude of the fading is smaller than the predetermined threshold value and when its own base station does not correspond to the at least one specific base station indicated by the base station information signal, and otherwise of turning, in each of the base stations, the forward transmission on.

According to an aspect of this invention, a method is for controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine a particular base station having a minimum propagation loss, of measuring, in the mobile station, magnitude of fading in the communication channels to produce a determined result indicative of whether or not the magnitude of the fading has a value which is larger than a predetermined threshold value, of transmitting, from the mobile station to the base stations via a reverse link, as a forward transmission power information signal, a combination of a base station information signal indicative of the particular base station, a fading information signal indicative of the determined result, and an error detection information signal for carrying out error detection of the base station information signal and the fading information signal, of decoding, in each of the base stations, the forward transmission power information signal to carry out the error detection on the fading information signal and the base station information signal using the error detection information signal, of lowering, in each of the base stations, transmission power in a forward transmission from an original value when an error is not detected in the error detection, when the fading information signal indicates that the value of the magnitude of the fading is smaller than the predetermined threshold value, and when its own base station does not correspond to the particular base station indicated by the base station information signal, and otherwise of turning, in each of the base stations, the transmission power of the forward transmission back to the original value.

According to another aspect of this invention, a method is for controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine a particular base station having a minimum propagation loss, of transmitting, from the mobile station to the base stations via a reverse link, as a forward transmission power information signal, a combination of a base station information signal indicative of the particular base station and an error detection information signal for carrying out error detection of the base station information signal, of decoding, in each of the base stations, the forward transmission power information signal to carry out the error detection on the base station information signal using the error detection information signal, of determining, in each of the base stations, whether or not magnitude of fading on the reverse link has a value which is larger than a predetermined threshold value, of lowering, in each of the base stations, transmission power in a forward transmission from an original value when an error is not detected in the error detection, when the value of the magnitude of the fading is smaller than the predetermined threshold value, and when its own base station does not correspond to the particular base station indicated by the base station information signal, and otherwise of turning, in each of the base stations, the transmission power of the forward transmission back to the original value.

According to still another aspect of this invention, a method is for controlling communication in a code division multiple access (CDMA) mobile communication system comprising a plurality of base stations, a base station control apparatus connected to the base stations, and a mobile station for making possible to communicate with the base stations via respective communication channels by a soft handover. The method comprises the steps of measuring, in the mobile station, magnitude of fading in the communication channels to produce a determined result indicative of whether or not the magnitude of the fading has a value which is larger than a predetermined threshold value, of transmitting, from the mobile station to the base stations via a reverse link, as a forward transmission power information signal, a combination of a fading information signal indicative of the determined result and an error detection information signal for carrying out error detection of the fading information signal, of decoding, in each of the base stations, the forward transmission power information signal to carry out the error detection on the fading information signal using the error detection information signal, of comparing, in the base station control apparatus, bit energy-to-interference ratios of the base stations in the respective communication channels to determine, as a particular base station, one of the base stations that has a maximum bit energy-to-interference ratio, of sending, from the base station control apparatus to the base stations, a base station information signal indicative of the particular base station, of lowering, in each of the base stations, transmission power in a forward transmission from an original value when an error is not detected in the error detection, when the fading information signal indicates that the value of the magnitude of the fading is smaller than the predetermined threshold value, and when its own base station does not correspond to the particular base station indicated by the base station information signal, and otherwise of turning, in each of the base stations, the transmission power of the forward transmission back to the original value.

According to yet another aspect of this invention, a method is for controlling communication in a code division multiple access (CDMA) mobile communication system comprising a plurality of base stations, a base station control apparatus connected to the base stations, and a mobile station for making possible to communicate with the base stations via the respective communication channels by a soft handover. The method comprises the steps of determining, in each of the base stations, whether or not magnitude of fading on a reverse link has a value which is larger than a predetermined threshold value, of comparing, in the base station control apparatus, bit energy-to-interference ratios of the base stations in the respective communication channels to determine, as a particular base station, one of the base stations that has a maximum bit energy-to-interference ratio, of sending, from the base station control apparatus to the base stations, a base station information signal indicative of the particular base station, of lowering, in each of the base stations, transmission power in a forward transmission from an original value when the value of the magnitude of the fading is smaller than the predetermined threshold value and when its own base station does not correspond to the particular base station indicated by the base station information signal, and otherwise of turning, in each of the base stations, the transmission power of the forward transmission back to the original value.

According to an aspect of this invention, a method is for controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine at least one specific base station in which forward transmission should be turned on in accordance with a predetermined reference value, of measuring, in the mobile station, magnitude of fading in the communication channels to produce a determined result indicative of whether or not the magnitude of the fading has a value which is larger than a predetermined threshold value, of transmitting, from the mobile station to the base stations via a reverse link, as a forward transmission power information signal, a combination of a base station information signal indicative of the at least one specific base station, a fading information signal indicative of the determined result, and an error detection information signal for carrying out error detection of the base station information signal and the fading information signal, of decoding, in each of the base stations, the forward transmission power information signal to carry out the error detection on the fading information signal and the base station information signal using the error detection information signal, of lowering, in each of the base stations, transmission power in a forward transmission from an original value when an error is not detected in the error detection, when the fading information signal indicates that the value of the magnitude of the fading is smaller than the predetermined threshold value, and when its own base station does not correspond to the at least one specific base station indicated by the base station information signal, and otherwise of turning, in each of the base stations, the transmission power of the forward transmission back to the original value.

According to another aspect of this invention, a method is for controlling communication in a code division multiple access (CDMA) mobile communication system comprising a plurality of base stations and a mobile station for making possible to communicate with the base stations via respective communication channels by a soft handover. The method comprises the steps of measuring, in the mobile station, propagation losses in the communication channels to determine at least one specific base station in which forward transmission should be turned on in accordance with a predetermined reference value, of transmitting, from the mobile station to the base stations via a reverse link, as a forward transmission power information signal, a combination of a base station information signal indicative of the at least one specific base station and an error detection information signal for carrying out error detection of the base station information signal, of decoding, in each of the base stations, the forward transmission power information signal to carry out the error detection on the base station information signal using the error detection information signal, of determining, in each of the base stations, whether or not magnitude of fading on the reverse link has a value which is larger than a predetermined threshold value, of lowering, in each of the base stations, transmission power in a forward transmission from an original value when an error is not detected in the error detection, when the value of the magnitude of the fading is smaller than the predetermined threshold value, and when its own base station does not correspond to the at least one specific base station indicated by the base station information signal, and otherwise of turning, in each of said base stations, the transmission power of the forward transmission back to the original value.

According to still another aspect of this invention, a method is for controlling communication in a code division multiple access (CDMA) mobile communication system comprising a plurality of base stations, a base station control apparatus connected to the base stations, and a mobile station for making possible to communicate with the base stations via respective communication channels by a soft handover. The method comprises the steps of measuring, in the mobile station, magnitude of fading in the communication channels to produce a determined result indicative of whether or not the magnitude of the fading has a value which is larger than a predetermined threshold value, transmitting, from the mobile station to the base stations via a reverse link, as a forward transmission power information signal, a combination of a fading information signal indicative of the determined result and an error detection information signal for carrying out error detection of the fading information signal, of decoding, in each of the base stations, the forward transmission power information signal to carry out the error detection on the fading information signal using the error detection information signal, of comparing, in the base station control apparatus, bit energy-to-interference ratios of the base stations in the respective communication channels to determine at least one specific base station in which forward transmission should be turned on in accordance with a predetermined reference value, of sending, from the base station control apparatus to the base stations, a base station information signal indicative of the at least one specific base station, of lowering, in each of the base stations, transmission power in a forward transmission from an original value when an error is not detected in the error detection, when the fading information signal indicates that the value of the magnitude of the fading is smaller than the predetermined threshold value, and when its own base station does not correspond to the at least one specific base station indicated by the base station information signal, and otherwise of turning, in each of the base stations, the transmission power of the forward transmission back to the original value.

According to yet another aspect of this invention, a method is for controlling communication in a code division multiple access (CDMA) mobile communication system comprising a plurality of base stations, a base station control apparatus connected to the base stations, and a mobile station for making possible to communicate with the base stations via respective communication channels by a soft handover. The method comprises the steps of determining, in each of the base stations, whether or not magnitude of fading on a reverse link has a value which is larger than a predetermined threshold value, of comparing, in the base station control apparatus, bit energy-to-interference ratios of the base stations in the respective communication channels to determine at least one specific base station in which forward transmission should be turned on in accordance with a predetermined reference value, of sending, from the base station control apparatus to the base stations, a base station information signal indicative of the at least one specific base station, of lowering, in each of the base stations, transmission power in a forward transmission from an original value when the value of the magnitude of the fading is smaller than the predetermined threshold value and when its own base station does not correspond to the at least one specific base station indicated by the base station information signal, and otherwise of turning, in each of the base stations, the transmission power of the forward transmission back to the original value.

According an aspect of this invention, a code division multiple access (CDMA) mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through the N-th communication channels to determine a particular base station having a minimum propagation loss and a fading measuring arrangement for measuring magnitude of fading in the first through the N-th communication channels to produce a determined result indicative of whether of not the magnitude of the fading has a value which is larger than a predetermined threshold value. Connected to the propagation loss measuring arrangement and the fading measuring arrangement, a transmitting arrangement transmits, to the first through the N-th base stations via a reverse link, as a forward transmission power information signal, a combination of a base station information signal indicative of the particular base station, a fading information signal indicative of the determined result, and an error detection information signal for carrying out error detection of the base station information signal and the fading information signal. An n-th base station, where n represents each of 1 through N, comprises a decoding arrangement for decoding the forward transmission power information signal to carry out the error detection on the fading information signal and the base station information signal using the error detection information signal. Connected to the decoding arrangement, a forward transmission on-off arrangement turns a forward transmission off when an error is not detected in the error detection, when the fading information signal indicates that the value of the magnitude of the fading is smaller than the predetermined threshold value, and when the n-th base station does not correspond to said particular base station indicated by the base station information signal. Otherwise, the forward transmission on-off arrangement turns the forward transmission on.

According to another aspect of this invention, a code division multiple access (CDMA) mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through the N-th communication channels to determine a particular base station having a minimum propagation loss. Connected to the propagation loss measuring arrangement, a transmitting arrangement transmits, to the first through the N-th base stations via a reverse link, as a forward transmission power information signal, a combination of a base station information signal indicative of the particular base station and an error detection information signal for carrying out error detection of the base station information signal. An n-th base station, where n represents each of 1 through N, comprises a decoding arrangement for decoding the forward transmission power information signal to carry out the error detection on the base station information signal using the error detection information signal and a fading determining arrangement for determining whether or not magnitude of fading on the reverse link has a value which is larger than a predetermined threshold value. Connected to the decoding arrangement and the fading determining arrangement, a forward transmission on-off arrangement turns a forward transmission off when an error is not detected in the error detection, when the value of the magnitude of the fading is smaller than the predetermined threshold value, and when said n-th base station does not correspond to the particular base station indicated by the base station information signal. Otherwise, the forward transmission on-off arrangement turns the forward transmission on.

According to still another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. The mobile station comprises a fading measuring arrangement for measuring magnitude of fading in the first through the N-th communication channels to produce a determined result indicative of whether or not the magnitude of the fading has a value which is larger than a predetermined threshold value. Connected to the fading measuring arrangement, a transmitting arrangement transmits, to the first through the N-th base stations via a reverse link, as a forward transmission power information signal, a combination of a fading information signal indicative of the determined result and an error detection information signal for carrying out error detection of the fading information signal. An n-th base station, where n represents each of 1 through N, comprises a decoding arrangement for decoding the forward transmission power information signal to carry out the error detection on the fading information signal using the error detection information signal. The base station control apparatus comprises a comparing arrangement for comparing first through N-th bit energy-to-interference ratios of the first through the N-th base stations in the first through the N-th communication channels to determine, as a particular base station, one of the first through the N-th base stations that has a maximum bit energy-to-interference ratio. Connected to the comparing means, a sending means sends a base station information signal indicative of the particular base station to the first through the N-th base stations. The n-th base station further comprises a forward transmission on-off arrangement, connected to the decoding arrangement and the sending arrangement, for turning a forward transmission off when an error is not detected in the error detection, when the fading information signal indicates that the value of the magnitude of the fading is smaller than the predetermined threshold value, and when the n-th base station does not correspond to the particular base station indicated by the base station information signal. Otherwise, the forward transmission on-off arrangement turns the forward transmission on.

According to yet another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. An n-th base station, where n represents each of 1 through N, comprises a fading determining arrangement for determining whether or not magnitude of fading on a reverse link has a value which is larger than a predetermined threshold value. The base station control apparatus comprises a comparing arrangement for comparing first through N-th bit energy-to-interference ratios of the first through the N-th base stations in said first through said N-th communication channels to determine, as a particular base station, one of the first through said N-th base stations that has a maximum bit energy-to-interference ratio. Connected to the comparing arrangement, a sending arrangement sends a base station information signal indicative of the particular base station to the first through the N-th base stations. The n-th base station further comprises a forward transmission on-off arrangement, connected to the fading determining arrangement and the sending arrangement, for turning a forward transmission off when the value of the magnitude of the fading is smaller than the predetermined threshold value and when the n-th base station does not correspond to the particular base station indicated by the base station information signal. Otherwise, the forward transmission on-off arrangement turns the forward transmission on.

According to an aspect of this invention, a code division multiple access (CDMA) mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through the N-th communication channels to determine at least one specific base station in which forward transmission should be turned on in accordance with a predetermined reference value and a fading measuring arrangement for measuring magnitude of fading in the first through the N-th communication channels to produce a determined result indicative of whether or hot the magnitude of the fading has a value which is larger than a predetermined threshold value. Connected to the propagation loss measuring arrangement and the fading measuring arrangement, a transmitting arrangement transmits, to said base stations via a reverse link, as a forward transmission power information signal, a combination of a base station information signal indicative of the at least one specific base station, a fading information signal indicative of the determined result, and an error detection information signal for carrying out error detection of the base station information signal and the fading information signal. An n-th base station, where n represents each of 1 through N, comprises a decoding arrangement for decoding the forward transmission power information signal to carry out the error detection on the fading information signal and the base station information signal using the error detection information signal. Connected to the decoding arrangement, a forward transmission on-off arrangement turns a forward transmission off when an error is not detected in the error detection, when the fading information signal indicates that the value of the magnitude of the fading is smaller than the predetermined threshold value, and when the n-th base station does not correspond to the at least one specific base station indicated by the base station information signal. Otherwise, the forward transmission on-off arrangement turns the forward transmission on.

According to another aspect of this invention, a code division multiple access (CDMA) mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through the N-th communication channels to determine at least one specific base station in which forward transmission should be turned on in accordance with a predetermined reference value. Connected to the propagation loss measuring arrangement, a transmitting arrangement transmit, to the base stations via a reverse link, as a forward transmission power information signal, a combination of a base station information signal indicative of the at least one specific base station and an error detection information signal for carrying out error detection of the base station information signal. An n-th base station, where n represents each of 1 through N, comprises a decoding arrangement for decoding the forward transmission power information signal to carry out the error detection on the base station information signal using the error detection information signal and a fading determining arrangement for determining whether or not magnitude of fading on the reverse link has a value which is larger than a predetermined threshold value. Connected to the decoding arrangement and the fading determining arrangement, a forward transmission on-off arrangement turns a forward transmission off when an error is not detected in the error detection, when the value of the magnitude of the fading is smaller than the predetermined threshold value, and when the n-th base station does not correspond to the at least one specific base station indicated by the base station information signal. Otherwise, the forward transmission on-off arrangement turns the forward transmission on.

According to still another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. The mobile station comprises a fading measuring arrangement for measuring magnitude of fading in the first through the N-th communication channels to produce a determined result indicative of whether or not the magnitude of the fading has a value which is larger than a predetermined threshold value. Connected to the fading measuring arrangement, a transmitting arrangement transmits, to the first through the N-th base stations via a reverse link, as a forward transmission power information signal, a combination of a fading information signal indicative of the determined result and an error detection information signal for carrying out error detection of the fading information signal. An n-th base station, where n represents each of 1 through N, comprises a decoding arrangement for decoding the forward transmission power information signal to carry out the error detection on the fading information signal using the error detection information signal. The base station control apparatus comprises a comparing arrangement for comparing first through N-th bit energy-to-interference ratios of the first through the N-th base stations in the first through the N-th communication channels to determine at least one specific base station in which forward transmission should be turned on in accordance with a predetermined reference value. Connected to the comparing arrangement, a sending arrangement sends a base station information signal indicative of the at least one specific base station to the first through the N-th base stations. The n-th base station further comprises a forward transmission on-off arrangement, connected to the decoding arrangement and the sending arrangement, for turning a forward transmission off when an error is not detected in the error detection, when the fading information signal indicates that the value of the magnitude of the fading is smaller than the predetermined threshold value, and when the n-th base station does not correspond to the least one specific base station indicated by the base station information signal. Otherwise, the forward transmission on-off arrangement turns the forward transmission on.

According to yet another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. An n-th base station, where n represents each of 1 through N, comprises a fading determining arrangement for determining whether or not magnitude of fading on a reverse link has a value which is larger than a predetermined threshold value. The base station control apparatus comprises a comparing arrangement for comparing first through N-th bit energy-to-interference ratios of the first through the N-th base stations in the first through the N-th communication channels to determine at least one specific base station in which forward transmission should be turned on in accordance with a predetermined reference value. Connected to the comparing arrangement, a sending arrangement sends a base station information signal indicative of the at least one specific base station to the first through the N-th base stations. The n-th base station further comprises a forward transmission on-off arrangement, connected to the fading determining arrangement and the sending arrangement, for turning a forward transmission off when the value of the magnitude of the fading is smaller than the predetermined threshold value and when the n-th base station does not correspond to said at least one specific base station indicated by the base station information signal. Otherwise, the forward transmission on-off arrangement turns the forward transmission on.

According to an aspect of this invention, a code division multiple access (CDMA) mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through the N-th communication channels to determine a particular base station having a minimum propagation loss and a fading measuring arrangement for measuring magnitude of fading in the first through the N-th communication channels to produce a determined result indicative of whether or not the magnitude of the fading has a value which is larger than a predetermined threshold value. Connected to the propagation loss measuring arrangement and the fading measuring arrangement, a transmitting arrangement transmits, to the first through the N-th base stations via a reverse link, as a forward transmission power information signal, a combination of a base station information signal indicative of the particular base station, a fading information signal indicative of the determined result, and an error detection information signal for carrying out error detection of the base station information signal and the fading information signal. An n-th base station, where n represents each of 1 through N, comprises a decoding arrangement for decoding the forward transmission power information signal to carry out the error detection on the fading information signal and the base station information signal using the error detection information signal. Connected to the decoding arrangement, a transmission power controlling arrangement lowers transmission power in a forward transmission from an original value when an error is not detected in the error detection, when the fading information signal indicates that the value of the magnitude of the fading is smaller than the predetermined threshold value, and when the n-th base station does not correspond to the particular base station indicated by the base station information signal. Otherwise, the transmission power controlling arrangement turns the transmission power of the forward transmission back to the original value.

According to another aspect of this invention, a code division multiple access (CDMA) mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through the N-th communication channels to determine a particular base station having a minimum propagation loss. Connected to the propagation loss measuring arrangement, a transmitting arrangement transmits, to the first through the N-th base stations via a reverse link, as a forward transmission power information signal, a combination of a base station information signal indicative of the particular base station and an error detection information signal for carrying out error detection of the base station information signal. An n-th base station, where n represents each of 1 through N, comprises a decoding arrangement for decoding the forward transmission power information signal to carry out the error detection on the base station information signal using the error detection information signal and a fading determining arrangement for determining whether or not magnitude of fading on the reverse link has a value which is larger than a predetermined threshold value. Connected to the decoding arrangement and the fading determining arrangement, a transmission power controlling arrangement lowers transmission power in a forward transmission from an original value when an error is not detected in the error detection, when the value of the magnitude of the fading is smaller than the predetermined threshold value, and when the n-th base station does not correspond to said particular base station indicated by the base station information signal. Otherwise, the transmission power controlling arrangement turns the transmission power of the forward transmission back to the original value.

According to still another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. The mobile station comprises a fading measuring arrangement for measuring magnitude of fading in the first through the N-th communication channels to produce a determined result indicative of whether or not the magnitude of the fading has a value which is larger than a predetermined threshold value. Connected to the fading measuring arrangement, a transmitting arrangement transmits, to the first through the N-th base stations via a reverse link, as a forward transmission power information signal, a combination of a fading information signal indicative of the determined result and an error detection information signal for carrying out error detection of the fading information signal. An n-th base station, where n represents each of 1 through N, comprises a decoding arrangement for decoding the forward transmission power information signal to carry out the error detection on the fading information signal using the error detection information signal. The base station control apparatus comprises a comparing arrangement for comparing first through N-th bit energy-to-interference ratios of the first through the N-th base stations in said first through the N-th communication channels to determine, as a particular base station, one of the base stations that has a maximum bit energy-to-interference ratio. Connected to the comparing arrangement, a sending arrangement sends a base station information signal indicative of the particular base station to the first through the N-th base stations. The n-th base station further comprises a transmission power controlling arrangement for lowering transmission power in a forward transmission from an original value when an error is not detected in the error detection, when the fading information signal indicates that the value of the magnitude of the fading is smaller than the predetermined threshold value, and when said n-th base station does not correspond to the particular base station indicated by the base station information signal. Otherwise, the transmission power controlling arrangement turns the transmission power of the forward transmission back to the original value.

According to yet another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. An n-th base station, where n represents each of 1 through N, comprises a fading determining arrangement for determining whether or not magnitude of fading on a reverse link has a value which is larger than a predetermined threshold value. The base station control apparatus comprises a comparing arrangement for comparing first through N-th bit energy-to-interference ratios of the first through the N-th base stations in the first through the N-th communication channels to determine, as a particular base station, one of the first though the N-th base stations that has a maximum bit energy-to-interference ratio. Connected to the comparing means, a sending arrangement sends a base station information signal indicative of the particular base station to the first through the N-th base stations. The n-th base station further comprises a transmission power controlling arrangement, connected to the fading determining arrangement and the sending arrangement, for lowering transmission power in a forward transmission from an original value when the value of the magnitude of the fading is smaller than the predetermined threshold value and when the n-th base station does not correspond to the particular base station indicated by the base station information signal. Otherwise, the transmission power controlling arrangement turns the transmission power of the forward transmission back to the original value.

According to an aspect of this invention, a code division multiple access (CDMA), mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through the N-th communication channels to determine at least one specific base station in which forward transmission should be turned on in accordance with a predetermined reference value and a fading measuring arrangement for measuring magnitude of fading in the first through the N-th communication channels to produce a determined result indicative of whether or not the magnitude of the fading has a value which is larger than a predetermined threshold value. Connected to the propagation loss measuring arrangement and the fading measuring arrangement, a transmitting arrangement transmits, to the first through the N-th base stations via a reverse link, as a forward transmission power information signal, a combination of a base station information signal indicative of the at least one specific base station, a fading information signal indicative of the determined result, and an error detection information signal for carrying out error detection of the base station information signal and the fading information signal. An n-th base station, wherein n represents each of 1 through N, comprises a decoding arrangement for decoding the forward transmission power information signal to carry out the error detection on the fading information signal and the base station information signal using the error detection information signal. Connected to the decoding arrangement, a transmission power controlling arrangement lowers transmission power in a forward transmission from an original value when an error is not detected in the error detection, when the fading information signal indicates that the value of the magnitude of the fading is smaller than the predetermined threshold value, and when the n-th base station does not correspond to said at least one specific base station indicated by the base station information signal. Otherwise, the transmission power controlling arrangement turns the transmission power of the forward transmission back to the original value.

According to another aspect of this invention, a code division multiple access (CDMA) mobile communication system comprises first through N-th base stations and a mobile station for making possible to communicate with the first through the N-th base stations via first through N-th communication channels by carrying out a soft handover, where N represents a positive integer which is not less than two. The mobile station comprises a propagation loss measuring arrangement for measuring first through N-th propagation losses in the first through N-th communication channels to determine at least one specific base station in which forward transmission should be turned on in accordance with a predetermined reference value. Connected to the propagation loss measuring arrangement, a transmitting arrangement transmits, to the first through the N-th base stations via a reverse link, as a forward transmission power information signal, a combination of a base station information signal indicative of the at least one specific base station and an error detection information signal for carrying out error detection of the base station information signal. An n-th base station, where n represents each of 1 through N, comprises a decoding arrangement for decoding the forward transmission power information signal to carry out the error detection on the base station information signal using the error detection information signal and a fading determining arrangement for determining whether or not magnitude of fading on the reverse link has a value which is larger than a predetermined threshold value. Connected to the decoding arrangement and the fading determining arrangement, a transmission power controlling arrangement lowers transmission power in a forward transmission from an original value when an error is not detected in the error detection, when the value of the magnitude of the fading is smaller than the predetermined threshold value, and when the n-th base station does not correspond to the at least one specific base station indicated by the base station information signal. Otherwise, the transmission power controlling arrangement turns the transmission power of the forward transmission back to the original value.

According to still another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. The mobile station comprises a fading measuring arrangement for measuring magnitude of fading in the first through the N-th communication channels to produce a determined result indicative of whether or not the magnitude of the fading has a value which is larger than a predetermined threshold value. Connected to the fading measuring arrangement, a transmitting arrangement transmits, to the first through the N-th base stations via a reverse link, as a forward transmission power information signal, a combination of a fading information signal indicative of the determined result and an error detection information signal for carrying out error detection of the fading information signal. An n-th base station, where n represents each of 1 through N, comprises a decoding arrangement for decoding the forward transmission power information signal to carry out the error detection on the fading information signal using the error detection information signal. The base station control apparatus comprises a comparing arrangement for comparing first through N-th bit energy-to-interference ratios of the first through the N-th base stations in the first through the N-th communication channels to determine at least one specific base station in which forward transmission should be turned on in accordance with a predetermined reference value. Connected to the comparing arrangement, a sending arrangement sends a base station information signal indicative of said at least one specific base station to the first through the N-th base stations. The n-th base station further comprises a transmission power controlling arrangement, connected to the decoding arrangement and the sending arrangement, for lowering transmission power in a forward transmission from an original value when an error is not detected in the error detection, when the fading information signal indicates that the value of the magnitude of the fading is smaller than the predetermined threshold value, and when the n-th base station does not correspond to said at least one specific base station indicated by the base station information signal. Otherwise, the transmission power controlling arrangement turns the transmission power of the forward transmission back to the original value.

According to yet another aspect of this invention, a code division multiple access (CDMA) mobile communication system comprises first through N-th base stations, a base station control apparatus connected to the first through the N-th base stations, and a mobile station for making possible to communicate with the first through the N-th base stations via first through N-th communication channels by carrying out a soft handover, where N represents a positive integer which is not less than two. An n-th base station, where n represents each of 1 through N, comprises a fading determining arrangement for determining whether or not magnitude of fading on a reverse link has a value which is larger than a predetermined threshold value. The base station control apparatus comprises a comparing arrangement for comparing first through N-th bit energy-to-interference ratios of the first through the N-th base stations in the first through the N-th communication channels to determine at least one specific base station in which forward transmission should be turned on in accordance with a predetermined reference value. Connected to the comparing arrangement, a sending arrangement sends a base station information signal indicative of the at least one specific base station to the first through the N-th base stations. The n-th base station further comprises a transmission power controlling arrangement, connected to the fading determining arrangement and the sending arrangement, for lowering transmission power in a forward transmission from an original value when the value of the magnitude of the fading is smaller than the predetermined threshold value and when the n-th base station does not correspond to the at least one specific base station indicated by the base station information signal. Otherwise, the transmission power controlling arrangement turns the transmission power of the forward transmission back to the original value.

BRIEF DESCRIPTION OF THE DRAWING

FIGS. 11A through 11C collectively show variations of a received level according to a transmission power control in a case where fading is large;

FIGS. 12A through 12C collectively show variations of a received level according to a transmission power control in a case where fading is small;

FIG. 30 is a table showing differences among the first through the fourth embodiments of this invention.

DESCRIPTION OF THE PREFERRED EMBODIMENTS

Figure 1:
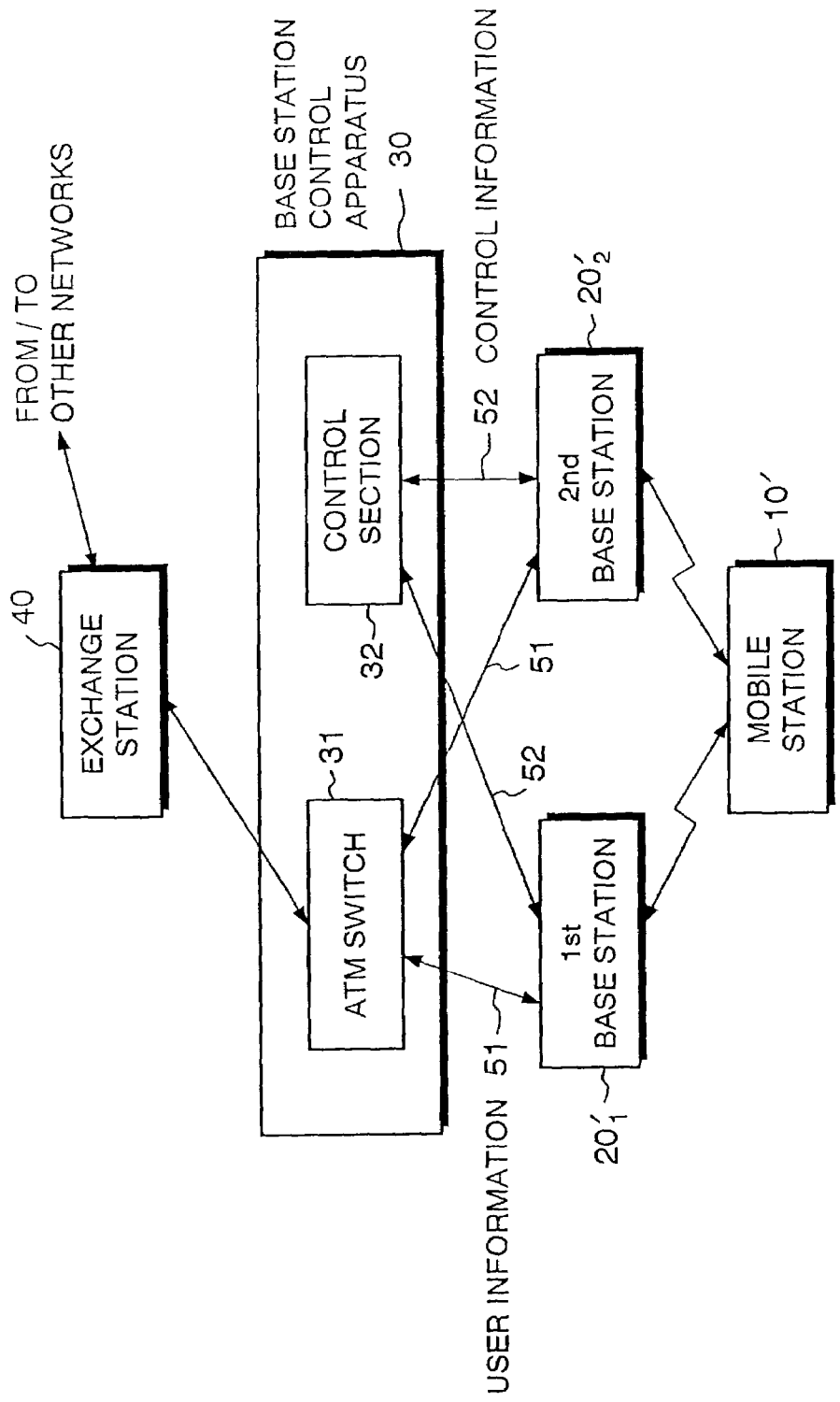
FIG. 1 is a block diagram of a conventional CDMA mobile communication system.

Referring to FIG. 1, a conventional code division multiple access (CDMA) mobile communication system will be described in order to facilitate an understanding of the present invention. The illustrated CDMA mobile communication system comprises a mobile station 10', first and second base stations $20'_1$ and $20'_2$ which communicate with the mobile station 10', a base station control apparatus 30 connected to the first and the second base stations $20'_1$ and $20'_2$, and an exchange station 40 connected to the base station control apparatus 30. The first and the second base stations $20'_1$ and $20'_2$ are similar in structure and operation each other.

Practically, the exchange station 40 is connected to other base station control apparatuses in addition to the base station control apparatus 30. In addition, the base station control apparatus 30 is connected to other base stations in addition to the first and the second base stations $20'_1$ and $20'_2$. Furthermore, each of the first and the second base stations $20'_1$ and $20'_2$ communicates with other mobile stations in addition to the mobile station 10'. The other base station control apparatuses, the other base stations, and the other mobile stations are herein omitted from FIG. 1 because of simplification of description.

In addition, the base station control apparatus 30 comprises an asynchronous transfer mode (ATM) switch 31 and a control section 32. The ATM switch 31 receives an ATM cell from the exchange station 40 and transmits the ATM cell as user information signals 51 to the first and the second base stations $20'_1$ and $20'_2$ in accordance with destination addresses. The control section 32 transmits, to the first and the second base stations $20'_1$ and $20'_2$, control information signals 52 for controlling operations of the first and the second base stations $20'_1$ and $20'_2$.

Figure 2:
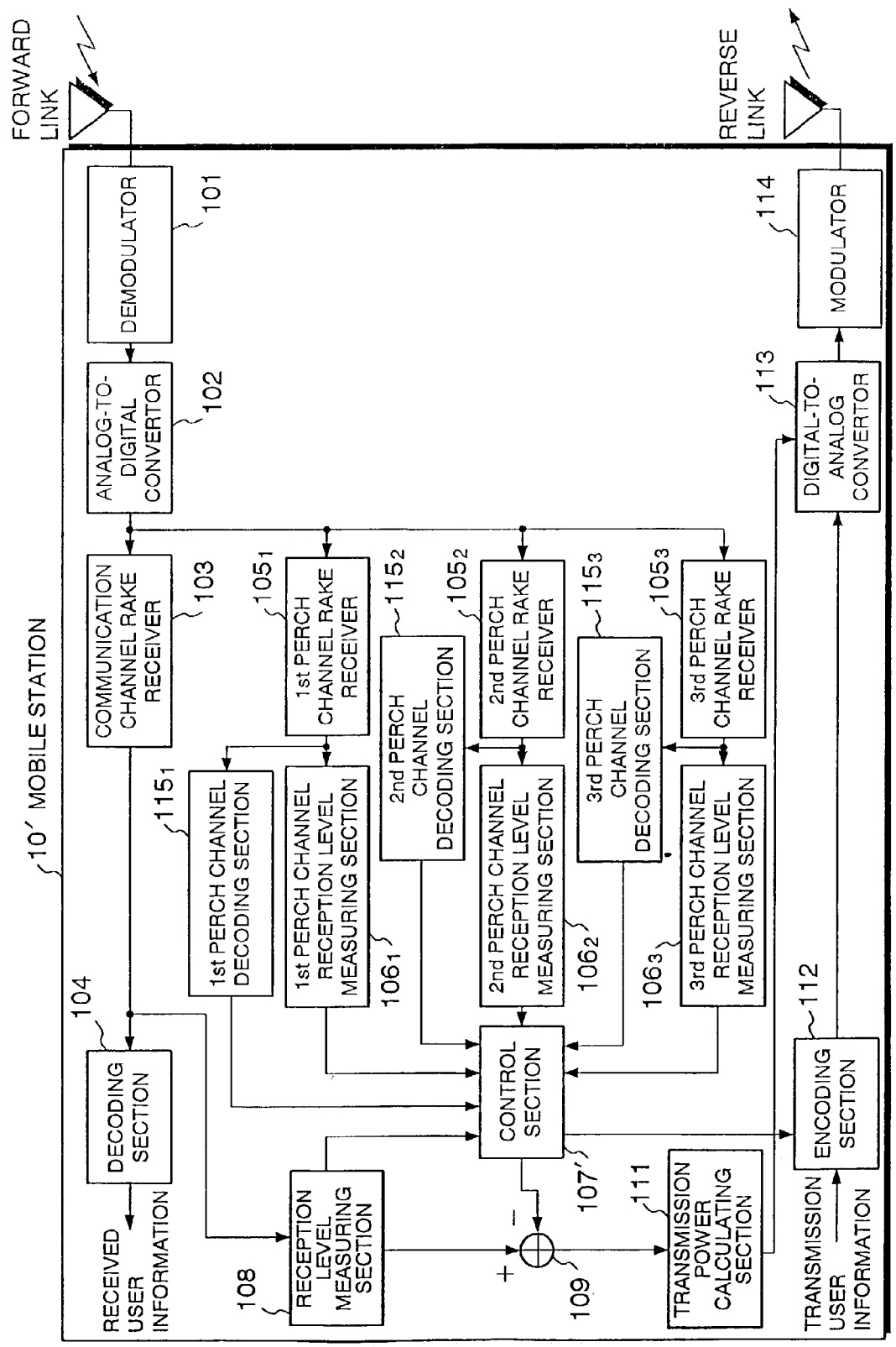
FIG. 2 is a block diagram of a conventional mobile station for use in the CDMA mobile communication system illustrated in FIG. 1.

Turning to FIG. 2, the description will proceed to a conventional mobile station 10' for use in the CDMA mobile communication system illustrated in FIG. 1. The mobile station 10' comprises a mobile demodulator 101, a mobile analog-to-digital converter 102, a mobile communication channel Rake receiver 103, a mobile decoding section 104, first through third perch channel Rake receivers $105_1$, $105_2$, and $105_3$, first through third perch channel reception level measuring sections $106_1$, $106_2$, and $106_3$, a mobile control section 107', a mobile reception level measuring section 108, a mobile subtracter 109, a mobile transmission power calculating section 111, a mobile encoding section 112, a mobile digital-to-analog converter 113, a mobile modulator 114, and first through third perch channel decoding sections $115_1$, $115_2$, and $115_3$.

In the mobile station 10', a received forward signal is supplied to the mobile demodulator 101. The mobile demodulator 101 demodulates the received forward signal into a mobile baseband signal. The mobile baseband signal is supplied to the mobile analog-to-digital converter 102. The mobile analog-to-digital converter 102 converts the mobile baseband signal into a mobile digital signal. The mobile digital signal is supplied to the mobile communication channel Rake receiver 103 and the first through the third perch channel RAKE receivers $105_1$ to $105_3$. The mobile communication channel RAKE receiver 103 carries out Rake synthesization on the mobile digital signal to produce a mobile synthesized signal. The mobile synthesized signal is supplied to the mobile decoding section 104 and the mobile reception level measuring section 108. The mobile decoding section 104 decodes the mobile synthesized signal to extract a mobile received user information signal. The mobile reception level measuring section 108 measures a mobile communication channel reception level of the mobile synthesized signal to produce a mobile communication channel reception level signal indicative of the mobile communication channel reception level. The mobile communication channel reception level signal is supplied to the mobile subtracter 109 and the mobile control section 107'.

Each base station is assigned with a perch channel. Each base station broadcasts a base station information signal via the perch channel. Each mobile station under each base station receives the base station information signal via the perch channel. The base station information signal is a part of a radio resource (RR) information signal which is exchanged between the mobile control section 107' in the mobile station 10' and the base control section 207' in the base station 20'. In addition, the base station information signal includes a transmission power value.

Supplied with the mobile digital signal, the first through the third perch channel RAKE receivers $105_1$ to $105_3$ receive first through third perch signals in the mobile digital signal on first through third perch channels, respectively. The first through the third perch signals are supplied to the first through the third perch channel reception level measuring sections $106_1$ to $106_3$, respectively. The first through the third perch channel reception level measuring sections $106_1$ to $106_3$ measure first through third perch channel reception levels of the first through the third perch signals to produce first through third perch channel reception level signals indicative of the first through the third perch channel reception levels, respectively. The first through the third perch channel reception level signals are sent to the mobile control section 107'.

In addition, the first through the third perch signals are supplied to the first through the third channel decoding sections $115_1$ to $115_3$, respectively. More specifically, the base station information signal is received in each of the first through the third perch channel RAKE receivers $105_1$ to $105_3$ through the mobile demodulator 101 and the analog-to-digital converter 102. Thereafter, the base station information signal is sent from the first through the third perch channel RAKE receivers $105_1$ to $105_3$ to the first through the third channel decoding sections $115_1$ to $115_3$. Each of the first through the third perch channel decoding sections $115_1$ to $115_3$ decodes the base station information signal to extract the transmission power value from the base station information signal. The transmission power value is supplied from each of the first through the third perch channel decoding section $115_1$ to $115_3$ to the mobile control section 107'.

The control mobile section 107' supplies a mobile target level signal indicative of a mobile target level to the mobile subtracter 109. Supplied with the mobile communication channel reception level signal and the mobile target level signal, the mobile subtracter 109 subtracts the mobile target level indicated by the mobile target level signal from the mobile communication channel reception level indicated by the mobile communication channel reception level signal to produce a mobile subtracted signal indicative of a difference between the mobile communication channel reception level and the mobile target level. The mobile subtracted signal is supplied to the mobile transmission power calculating section 111. The mobile transmission power calculating section 111 calculates a forward transmission power on the basis of the mobile subtracted signal to produce a forward transmission power information signal indicative of the forward transmission power. The forward transmission power information signal is supplied to the mobile digital-to-analog converter 113.

The mobile encoding section 112 is supplied with a mobile transmission user information signal. The mobile encoding section 112 encodes the mobile transmission user information signal into a mobile encoded signal. The mobile encoded signal is supplied to the mobile digital-to-analog converter 113. The mobile digital-to-analog converter 113 converts the mobile encoded signal with the mobile forward transmission power information signal into a mobile analog signal. The mobile analog signal is supplied to the mobile modulator 114. The mobile modulator 114 modulates a carrier signal by the mobile analog signal to produce a mobile modulated signal. The mobile modulated signal is transmitted as a reverse transmission signal to the base station via a reverse link.

Figure 3:
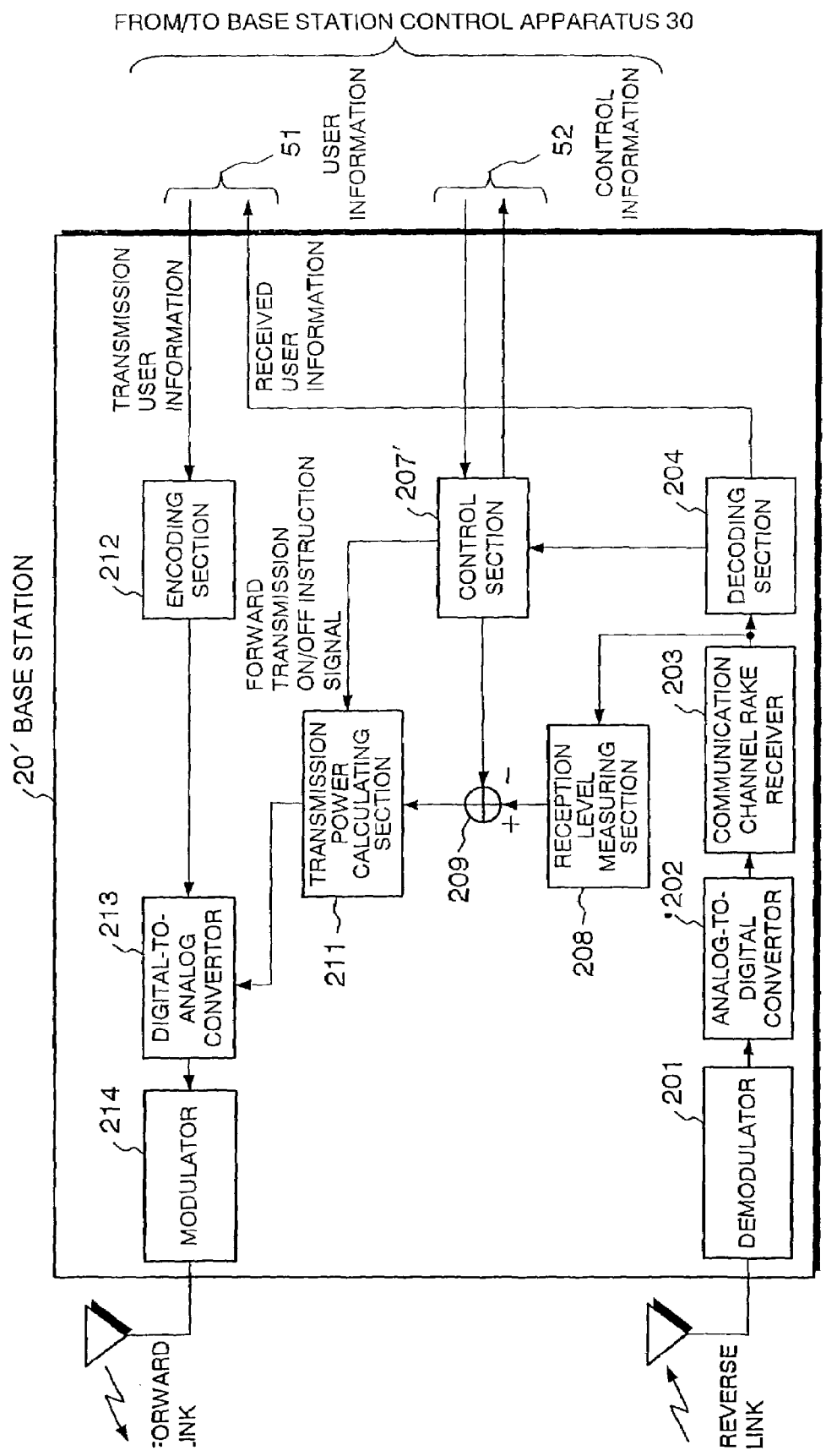
FIG. 3 is a block diagram of a conventional base station for use in the CDMA mobile communication system illustrated in FIG. 1.

Turning to FIG. 3, the description will proceed to a conventional base station 20' (suffix omitted) for use in the CDMA mobile communication system illustrated in FIG. 1. The base station 20' comprises a base demodulator 201, a base analog-to-digital converter 202, a base communication channel Rake receiver 203, a base decoding section 204, a base control section 207', a base reception level measuring section 208, a base subtracter 209, a base transmission power calculating section 211, a base encoding section 212, a base digital-to-analog converter 213, and a base modulator 214.

In the base station 20', a received reverse signal is supplied to the base demodulator 201. The base demodulator 201 demodulates the received reverse signal into a base baseband signal. The base baseband signal is supplied to the base analog-to-digital converter 202. The base analog-to-digital converter 202 converts the base baseband signal into a base digital signal. The base digital signal is supplied to the base communication channel Rake receiver 203. The base communication channel Rake receiver 203 carries out Rake synthesization on the base digital signal to produce a base synthesized signal. The base synthesized signal is supplied to the base decoding section 204 and the base reception level measuring section 208. The base decoding section 204 decodes the base synthesized signal to extract a base received user information signal. The base reception level measuring section 208 measures a base communication channel reception level of the base synthesized signal to produce a base communication channel reception level signal indicative of the base communication channel reception level. The base communication channel reception level signal is supplied to the base subtracter 209.

The base control section 207' supplies a base target level signal indicative of a base target level to the base subtracter 209. The base control section 207 supplies a forward transmission on/off instruction signal to the base transmission power calculating section 211.

Supplied with the base communication channel reception level signal and the base target level signal, the base subtracter 209 subtracts the base target level indicated by the base target level signal from the base communication channel reception level indicated by the base communication channel reception level signal to produce a base subtracted signal indicative of a difference between the base communication channel reception level and the base target level. The base subtracted signal is supplied to the base transmission power calculating section 211. The base transmission power calculating section 111 calculates a forward transmission power on the basis of the base subtracted signal and the forward transmission on/off instruction signal to produce a forward transmission power information signal indicative of the forward transmission power. The forward transmission power information signal is supplied to the base digital-to-analog converter 213.

The base encoding section 212 is supplied with a base transmission user information signal. The base encoding section 212 encodes the base transmission user information signal into a base encoded signal. The base encoded signal is supplied to the base digital-to-analog converter 213. The base digital-to-analog converter 213 converts the base encoded signal on the bases of the forward transmission power information signal into a base analog signal. The base analog signal is supplied to the base modulator 214. The base modulator 214 modulates a carrier signal by the base analog signal to produce a base modulated signal. The base modulated signal is transmitted as a forward transmission signal to the mobile station via a forward link.

In the above-mentioned CDMA mobile communication system, each base station covers a cell which is a area where the base station can communicate with the mobile station. In addition, the mobile station moves with a communication channel established between the mobile station and a base station. When the mobile station goes out of the cell covered by the base station, the mobile station must carry out a handover for establishing a new communication channel with another base station which cover a cell where the mobile station moves.

Figure 4:
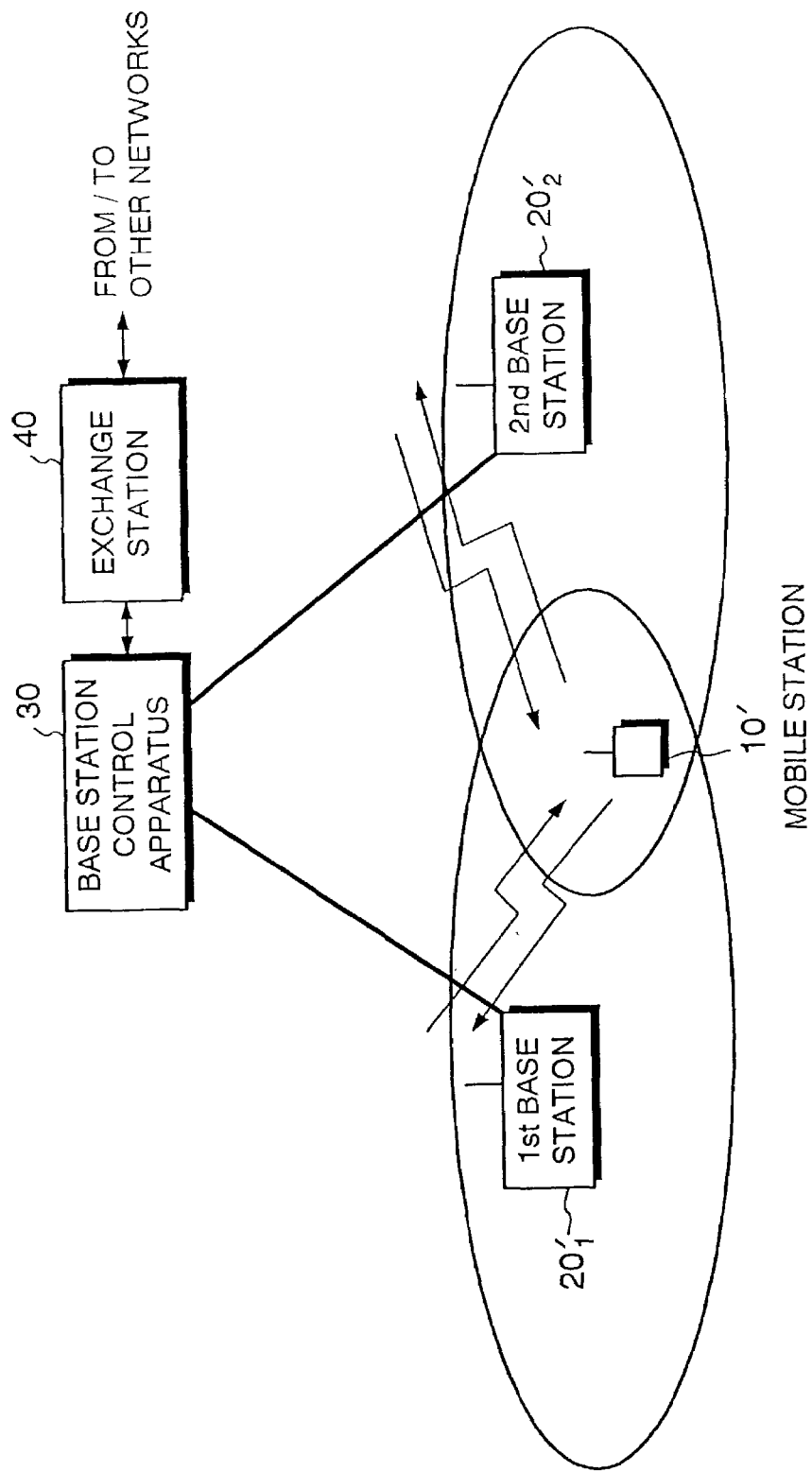
FIG. 4 is a view showing a case where two base stations carry out forward transmission to one mobile station.

The mobile communication system adopting a spread spectrum system carries out a soft handover in order to maintain a service quality by avoiding a momentary interruption or the like on carrying out the handover between the base stations. As shown in FIG. 4, the soft handover is the handover where the mobile station $10'$ simultaneously carries out communication with a plurality of base stations $20'_1$ and $20'_2$ and is a peculiar function to the spread spectrum communication which can use the same radio frequency.

However, inasmuch as the same information signal is transmitted from the plurality of base stations $20'_1$ and $20'_1$ to the mobile station $10'$ when the soft handover is carried out, transmission power in the forward link per communication is much. As a result, interference power affecting other communications increases and it results in a restriction of a communication capacity.

Figure 5:
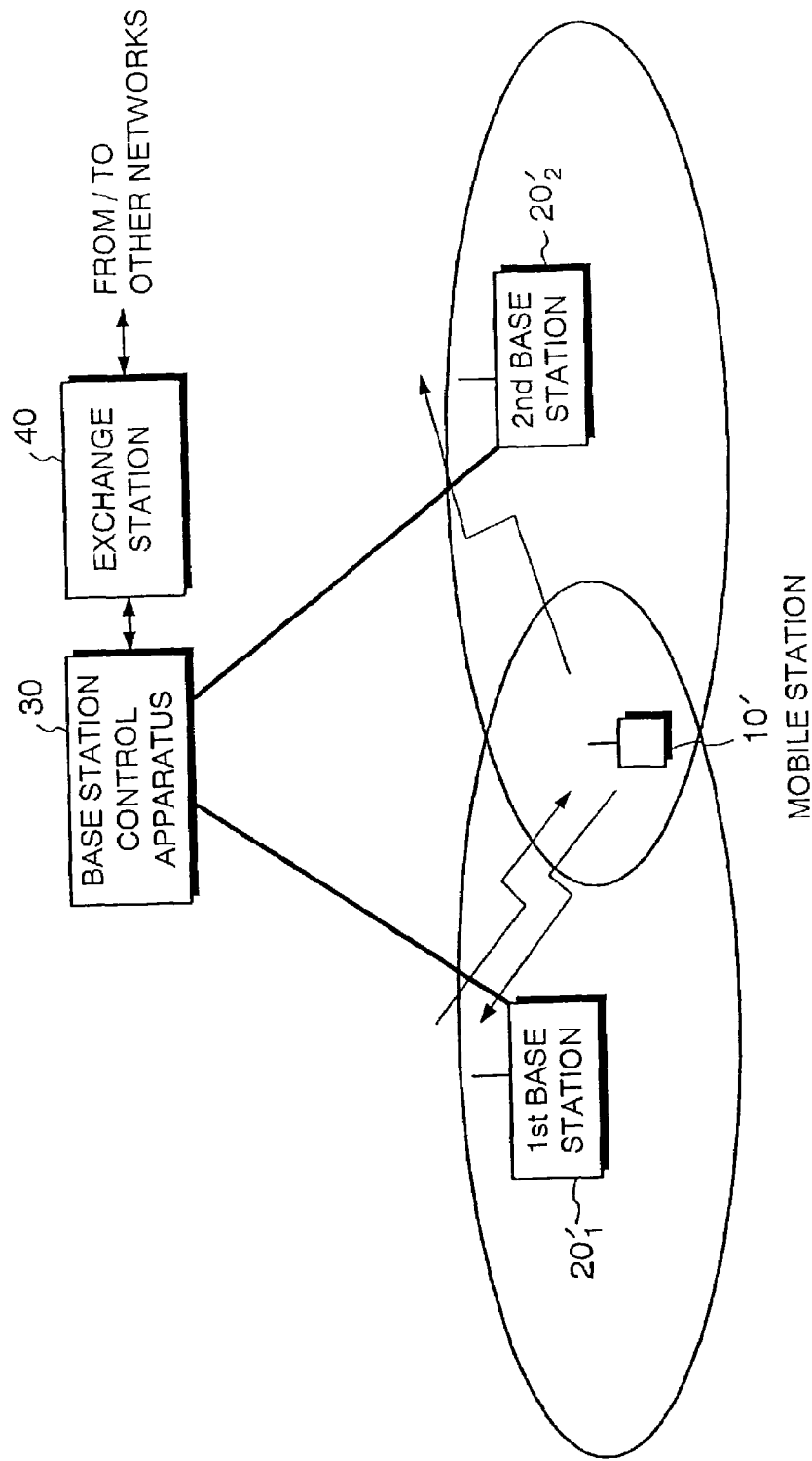
FIG. 5 is a view showing another case where one base station carries out forward transmission to one mobile station.

In order to improve such a restriction, for instance, a method of decreasing transmission power in the forward link per communication by carrying out forward transmission from one base station having the least propagation loss on the soft handover, as illustrated in FIG. 5, is disclosed in an article contributed by Furukawa (NEC Corporation) to the Communications Society Conf., IEICE, B-5-118, March 1998.

Figure 6:
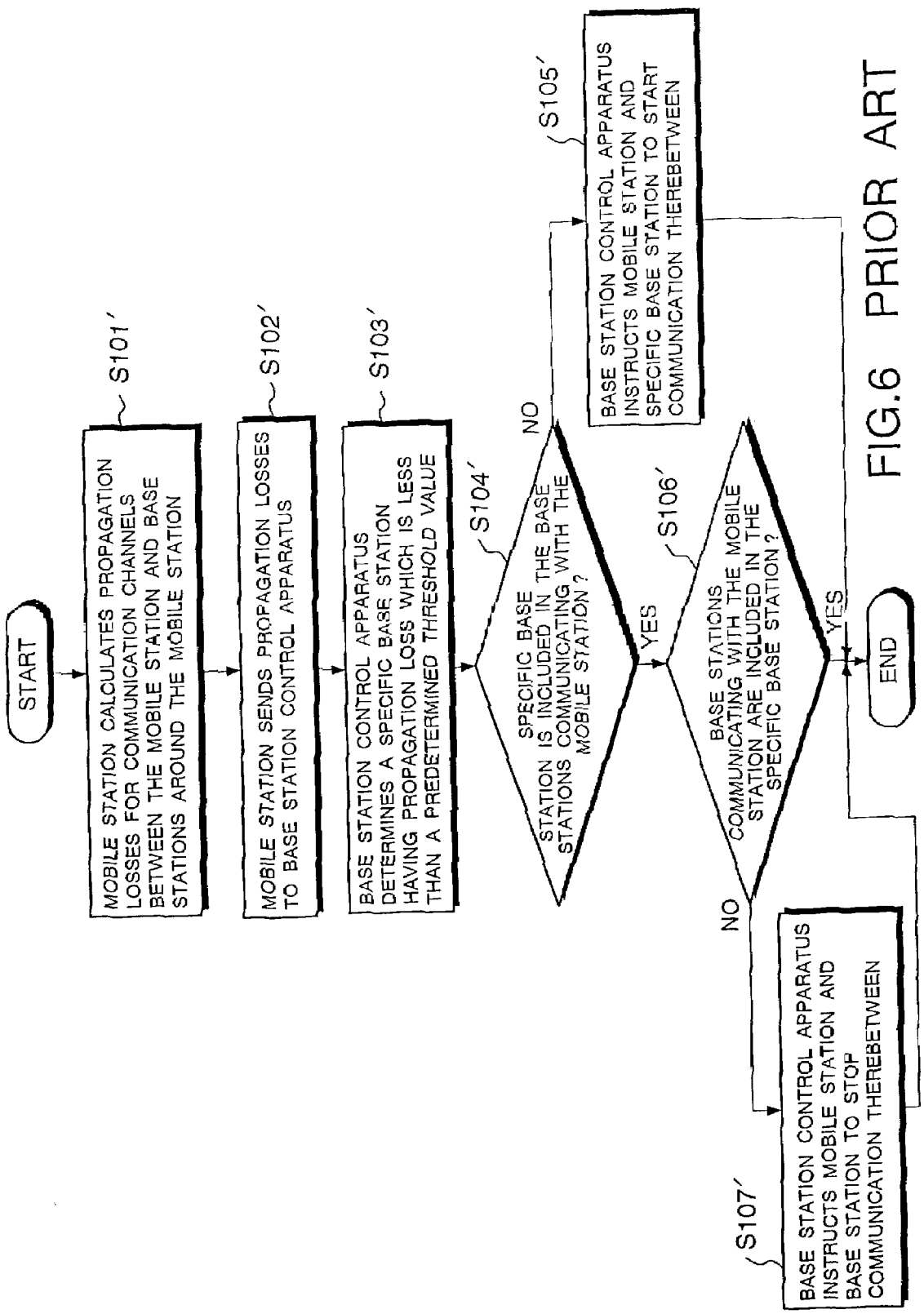
FIG. 6 is a flow chart for use in describing operation of the CDMA mobile communication system illustrated in FIG. 1.

Referring to FIG. 6 in addition to FIG. 5, the description will proceed to the method of decreasing the transmission power in the forward link.

At a step $S101'$, the mobile station $10'$ calculates propagation losses for communication channels between the mobile station $10'$ and the first and the second base stations $20'_1$ and $20'_2$ around the mobile station $10'$. The step $S101'$ is followed by a step $S102'$ at which the mobile station $10'$ sends propagation loss signals indicative of the propagation losses to the base station control apparatus 30 through the first and the second base stations $20'_1$ and $20'_2$. The step $S102'$ proceeds to a step $S103'$ at which the base station control apparatus 30 determines a specific base station having the propagation loss which is less than a predetermined threshold value.

In the example being illustrated, the specific base station is the first base station $20'_1$. In other words, the second base station $20'_2$ has the propagation loss which is not less than the predetermined threshold value.

The step $S103'$ is succeeded by a step $S104'$ at which the base station control apparatus 30 determines whether or not the specific base station is included in the base stations communicating with the mobile station $10'$. It will be assumed that the specific or the first base station $20'_1$ is not included in the base stations communicating with the mobile station $10'$. In this event, the step $S104'$ is followed by a step $S105'$ at which the base station control apparatus 30 instructs the mobile station $10'$ and the specific or the first base station $20'_1$ to start communication between the mobile station $10'$ and the specific or the first base station $20'_1$.

It will be presumed that the specific or the first base station $20'_1$ is included in the base stations communicating with the mobile station $10'$. Under the circumstances, the step $S104'$ proceeds to a step $S106'$ at which the base station control apparatus 30 determines whether or not the base stations communicating with the mobile station $10'$ are included in the specific base station. Inasmuch as the second base station $20'_2$ is not included in the specific base station, the step $S106'$ is succeeded by a step $S107'$ at which the base station control apparatus 30 instructs the mobile station $10'$ and the second base station $20'_2$ to stop communication between the mobile station $10'$ and the second base station $20'_2$.

However, it is impossible for this conventional forward transmission power control method to secure a user quality in a case where there is a large fading in a communication channel. This is because the transmission is always carried out from only one base station on the soft handover.

In a multimedia communication, prediction is made that a transmission rate where a large capacity of data is transmitted from a data base at a network side to the mobile station is large. When the rate of the multimedia is large in future, it is necessary to increase a radio channel capacity of the forward link in comparison with that of the reverse link. As a result, it is necessary to decrease the transmission power of the forward link.

In addition, as regards the reverse link which is a communication channel from the mobile station to the base station, one transmission is always carried out per communication and an effect of the soft handover is obtained by receiving in a plurality of base stations. Accordingly, the problem of increasing the transmission power does not arise on carrying out the soft handover.

At any rate, the above-mentioned conventional CDMA mobile communication system is disadvantageous in that the communication capacity of the forward link is restricted on carrying out the soft handover. This is because the transmission power of the forward link per communication increases and interference power affecting other communications increases.

Now, the description will be proceed to preferred embodiments of the present invention in reference with following figures.

In first through fifth embodiments of the present invention, in a case where a soft handover where a plurality of base stations carry out forward transmission of the same contents to one mobile station, when a fading in a forward channel is small, communication is carried out between the mobile station and the base station having a minimum propagation loss among the base stations and other base stations turn transmission off.

As regards the mobile station in environment affecting less fading that is put into, for example, a static state, there is less effect obtained by transmitting forward transmission signals from the plurality of base stations. Inasmuch as it is possible to minimize a predetermined bit energy-to-interference ratio Eb/I0 in order to obtaining a predetermined radio quality under a low-speed fading having a large effect for control which maintains a received power at a constant by a high-speed power control, degradation of a service quality does not occur although the forward transmission is carried out by one base station having the minimum propagation loss.

It is therefore possible to secure a reception character by transmitting the same signal from a plurality of base stations to the mobile station when a fading in a communication channel with respect to the base stations is large. In addition, it is possible of decrease a forward channel capacity due to decrement of interference in the forward link with a service quality maintained by transmitting a signal from one base station to the mobile station when the fading is small.

In addition, the following first through fourth embodiments are different from each other with respect to measurement of magnitude of a fading and determination of the base station having a minimum propagation loss in the manner which will become clear as the description proceeds.

Figure 7:
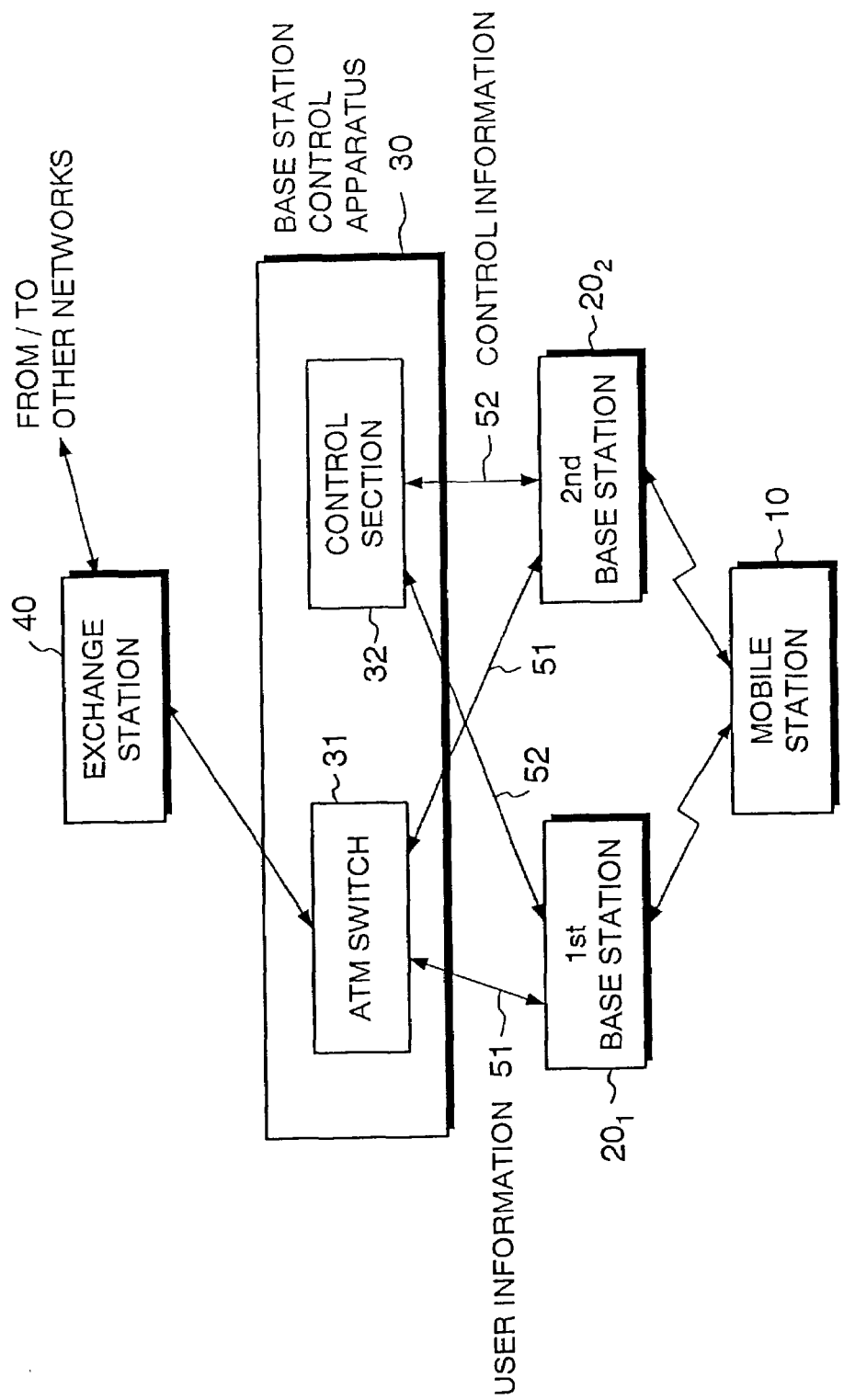
FIG. 7 is a block diagram of a CDMA mobile communication system according to a first embodiment of this invention.

Referring to FIGS. 7 through 16, the description will proceed to a CDMA mobile communication system according to a first embodiment of this invention. FIG. 7 is a block diagram of the CDMA mobile communication system according to the first embodiment of this invention. The illustrated CDMA mobile communication system is similar in structure and operation to the conventional CDMA communication system illustrated in FIG. 1 except that the mobile station, the first and the second base stations are modified from those illustrated in FIG. 1 as will later become clear. The mobile station, the first and the second base stations are therefore depicted at $10$, $20_1$, and $20_2$.

Figure 8:
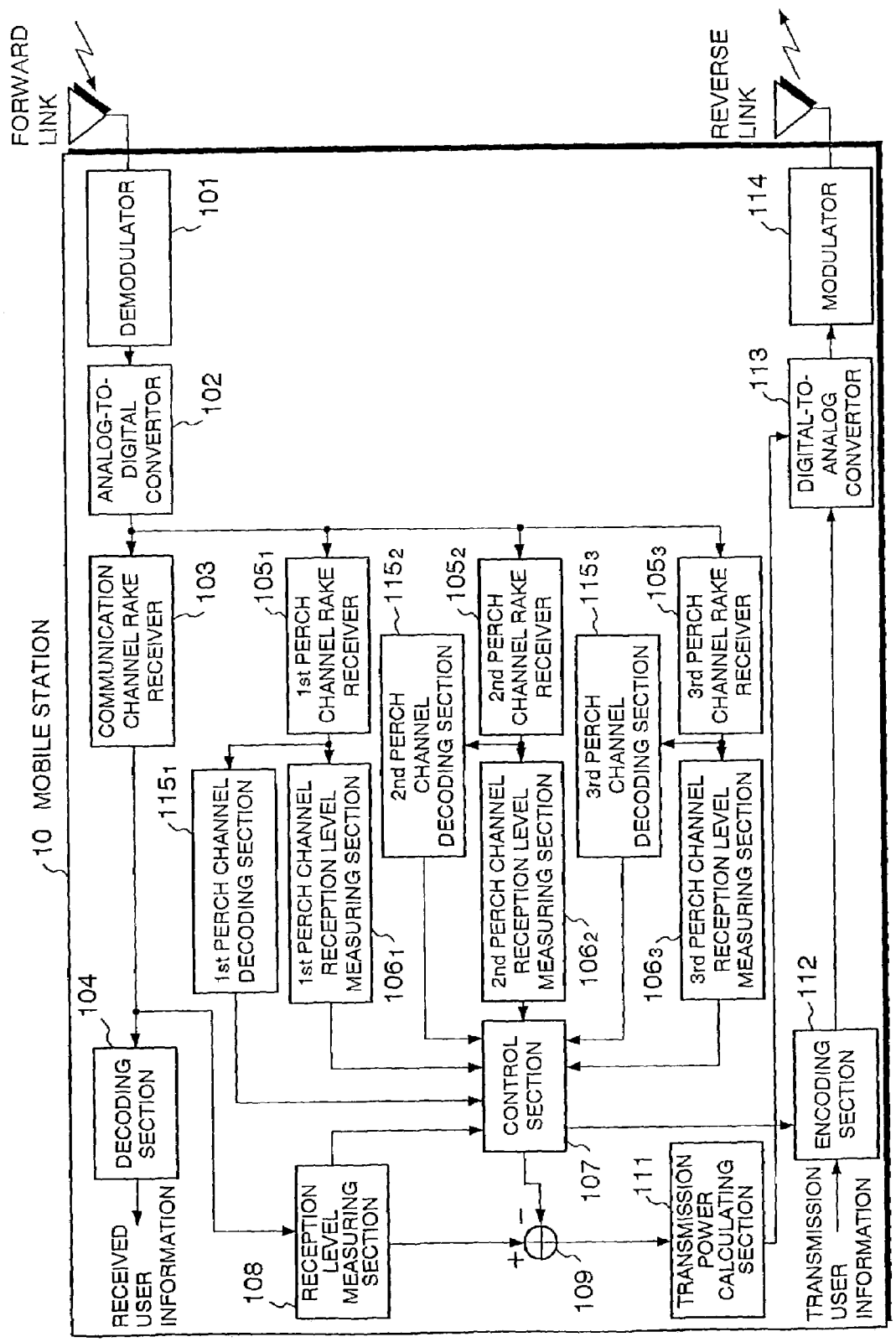
FIG. 8 is a block diagram of a mobile station for use in the CDMA mobile communication system illustrated in FIG. 7.
Figure 9:
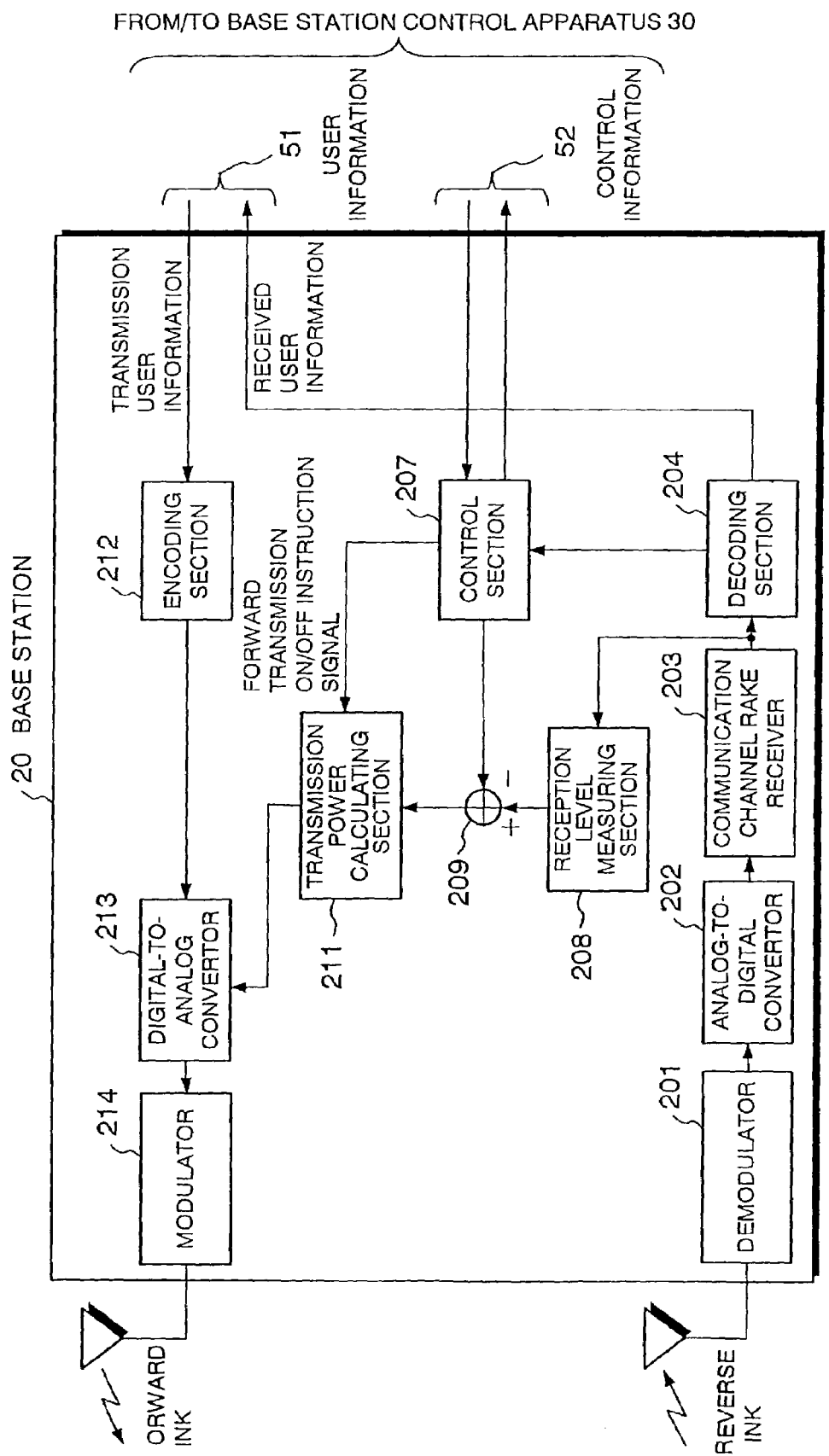
FIG. 9 is a block diagram of a base station for use in the CDMA mobile communication system illustrated in FIG. 7.

FIG. 8 is a block diagram of the mobile station 10 for use in the CDMA mobile communication system illustrated in FIG. 7 while FIG. 9 is a block diagram of the base station 20 (suffix omitted) for use in the CDMA mobile communication system illustrated in FIG. 7.

As shown in FIG. 8, the illustrated mobile station 10 is similar in structure and operation to the conventional mobile station 10' illustrated in FIG. 2 except that the mobile control section is modified from that illustrated in FIG. 2 as will later become clear. The mobile control section is therefore depicted at 107.

As shown in FIG. 9, the illustrated base station 20 is similar in structure and operation to the conventional mobile station 20' illustrated in FIG. 3 except that the base control section is modified from that illustrated in FIG. 3 as will later become clear. The base control section is therefore depicted at 207.

In the first embodiment, the mobile station 10 determines the magnitude of the fading in the forward link and detects the base station having the minimum propagation loss on tie bases of the received power in the perch channel.

Figure 10:
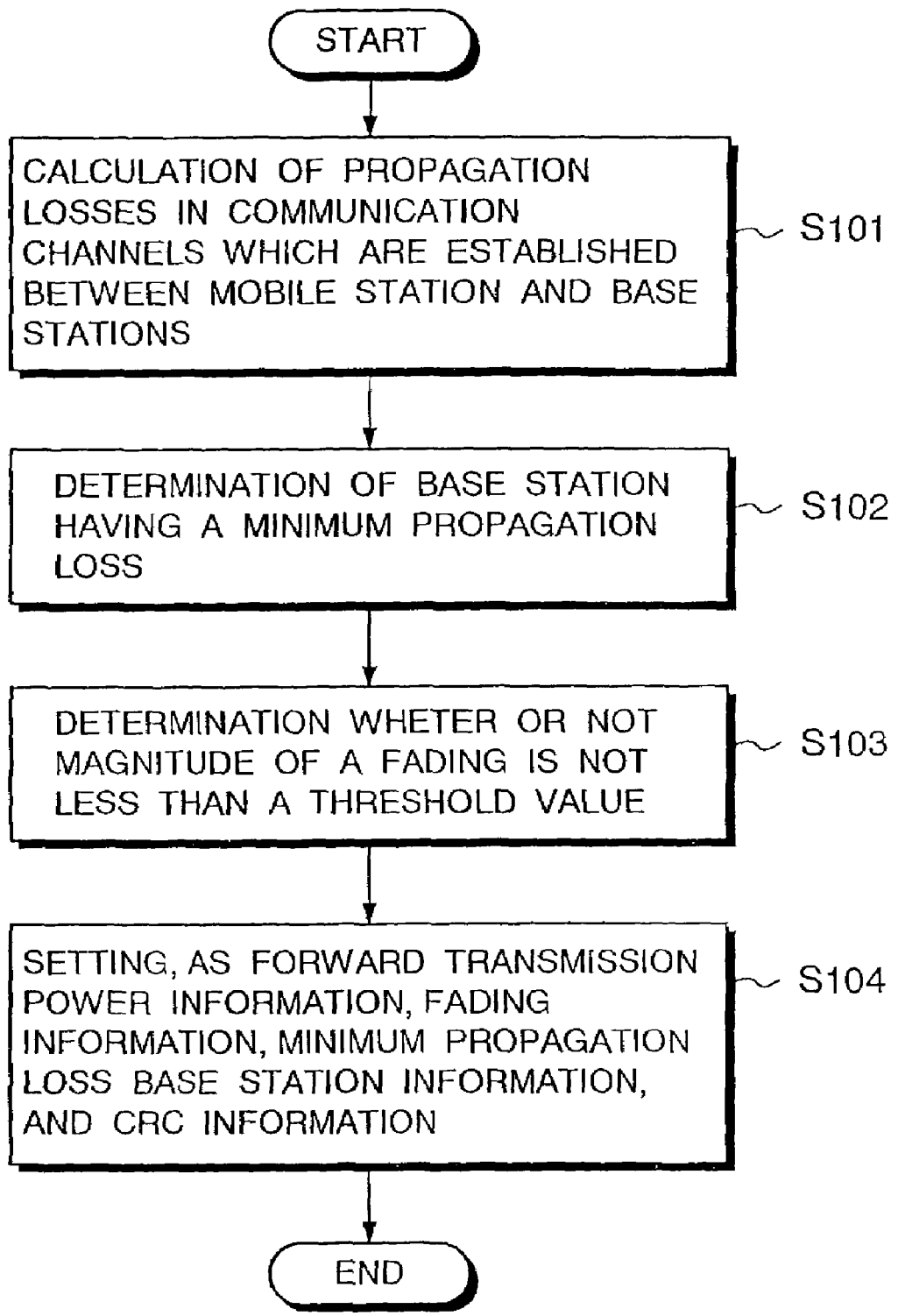
FIG. 10 is a flow chart for use in describing operation of the mobile station illustrated in FIG. 8.

Referring to FIG. 10 in addition FIG. 8, description will be made as regards operation of the mobile station 10 in the CDMA mobile communication system according the first embodiment.

At a step S101, the mobile control section 107 calculates first through third propagation losses in first through third communication channels which are established between the mobile station 10 and first through third base stations. Specifically, the first through the third perch channel decoding sections $115_1$ to $115_3$ supply the mobile control section 107 with first through third transmission power values in first through third perch channels which are sent from the first through the third base stations carrying out the soft handover. In addition, the first through the third perch channel reception level measuring sections $106_1$ to $106_3$ measures first through third received powers in the first through the third perch channels to produce first through third received power values indicative of the first through the third received powers. The first through the third received power values are supplied to the mobile control section 107. The mobile control section 107 calculates first through third differences between the first through the third transmission power values and the first through the third received power values. The mobile control section 107 calculates the first through the third propagation losses in the first though the third communication channels on the basis of the first through the third differences.

The step S101 is followed by a step S102 at which the mobile control section 107 determines, as a particular base station, one of the first through the third base stations that has a minimum propagation loss among the first through the third propagation losses.

The step S102 is succeeded by a step S103 at which the mobile control section 107 determines whether or not a fading is large by comparing a transmission power control error with a threshold value. Specifically, the mobile reception level measuring section 108 measures the mobile communication channel reception level of the mobile synthesized signal to produce the mobile communication channel reception level signal indicative of the measured mobile communication channel reception level which is supplied to the mobile control section 107. The mobile control section 107 has a predetermined set reception level so that the forward received user information signal has a predetermined quality. The predetermined quality is, for example, that a frame error rate is equal to 0.01. The mobile control section 107 determines, as the transmission power control error, a difference between the measured mobile communication channel reception level and the predetermined set reception level.

Figures 11A, 11B, 12A, 12B:
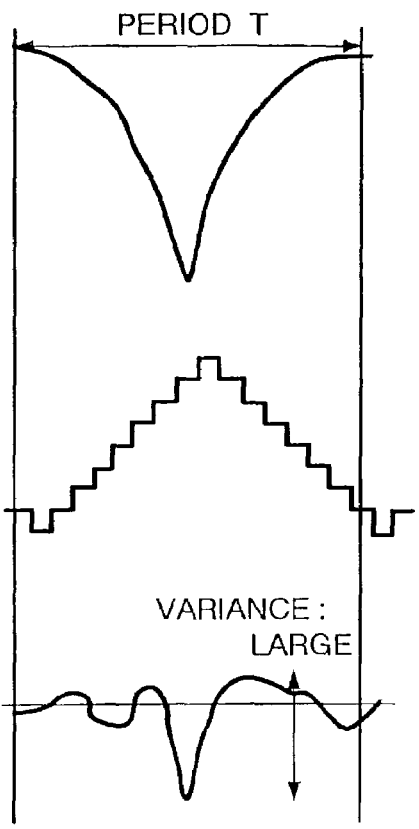

Turning to FIGS. 11A, 11B, 11C, 12A, 12B, and 12C, the description will proceed to a concrete method which carries out determination of large and small in the fading. FIGS. 11A through 11C collectively show variation of the measured mobile communication channel reception level under the transmission power control when the fading is large. FIG. 11A shows variation of the measured mobile communication channel reception level in a case where the transmission power control is not carried out. FIG. 11B shows variation of the transmission power under the transmission power control. FIG. 11C shows variation of the measured mobile communication channel reception level in a case where the transmission power control is carried out.

Likewise, FIGS. 12A through 12C collectively show variation of the measured mobile communication channel reception level under the transmission power control when the fading is small. FIG. 12A shows variation of the measured mobile communication channel reception level in a case where the transmission power control is not carried out. FIG. 12B shows variation of the transmission power under the transmission power control. FIG. 12C shows variation of the measured mobile communication channel reception level in a case where the transmission power control is carried out.

Detection of a fading amount in a communication channel is achieved by measuring a variation amount in the reception level on the transmission power control or the transmission power control error which is an error between a target received power and an actually received power and by calculating variance or standard deviation of the variation amount in the reception level or the transmission power control error.

It will be assumed that the variation of the fading in the communication channel is gentle as shown in FIGS. 12A through 12C. In this event, the variation amount in the reception level or the transmission power control error is small. This is because it is possible to maintain the received power at a constant due to a high-speed power control. It will be assumed that the variation of the fading in the communication channel is violent as shown in FIGS. 11A through 11C. In this event, the variation amount in the reception level or the transmission power control error is large. This is because it is difficult to accurately maintain the received power at the constant due to the high-speed power control.

In addition, the variation amount in the reception level or the transmission power control error may be calculated by averaging the reception level every predetermined period, using a method of moving averages, or using an oblivion coefficient.

Figures 13, 14:
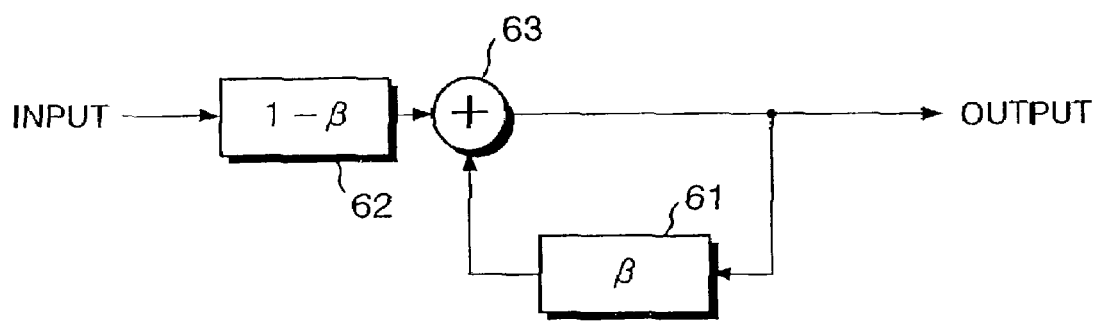
FIG. 13 is a view for use in describing a moving average.
FIG. 14 is a view for use in describing a method of calculating an average value to using an oblivion coefficient.

Turning to FIG. 13, the description will proceed to the method of moving averages. The method of moving averages is a method of successively calculating averages of a plurality of values at time instants for a predetermined time interval. It will be assumed that values a, $a_2$, $a_3$, $a_4$, $a_5$, $a_6$, $a_7$, $a_8$, $a_9$, ..., and so on are obtained as illustrated in FIG. 11. In this event, values by means of the moving averages are an average value of the values $a_1$ to $a_5$ at a time instant when the value $a_5$ is obtained, an average value of the values $a_2$ to $a_6$ at a time instant when the value $a_6$ is obtained, an average value of the values $a_3$ to $a_7$ at a time instant when the value $a_7$ is obtained, and so on.

Turning to FIG. 14, the description will proceed to the method of using the oblivion coefficient. The method of using the oblivion coefficient is a method of calculating a current value by adding a value obtained by multiplying a preceding value before a time instant by the oblivion coefficient less than one to another value obtained by multiplying a value at the time instant by a value which is obtained by subtracting the oblivion coefficient from one. FIG. 14 is a block diagram showing calculation of the method of using the oblivion coefficient.

As illustrated in FIG. 14, a calculating circuit comprises first and second multipliers 61 and 62, and an adder 63. In FIG. 14, the oblivion coefficient is depicted at $\beta$. The first multiplier 61 is given by the oblivion coefficient $\beta$ while the second multiplier 62 is given by the value $(1-\beta)$ obtained by subtracting the oblivion coefficient $\beta$ from one. The first multiplier 61 is supplied with a preceding output value while the second multiplier 62 is supplied with a current input value. The first multiplier 61 multiplies the preceding output value by the oblivion coefficient $\beta$ to produce a first multiplied value. The first multiplied value is supplied to the adder 63. The second multiplier 62 multiplies the current input value by the value $(1-\beta)$ to produce a second multiplied value. The second multiplied value is supplied to the adder 63. The adder 63 adds the first multiplied value and the second multiplied value to produce an added value as a current output value.

In addition, another method of detecting the magnitude of the fading is a method of measuring variance or standard deviation of variation amount in a fading vector which is obtained by carrying out channel estimation. The mobile control section 107 determines that the fading is large when the variance or the standard deviation of the variation amount in the fading vector is larger than the threshold value. On the other hand, the mobile control section 107 determines that the fading is small when the variance or the standard deviation of the variation amount in the fading vector is smaller than the threshold value. The variance or the standard deviation of the variation amount in the fading vector is also calculated by averaging the fading vector every predetermined period, using the method of moving averages, or using the oblivion coefficient.

Turning back to FIG. 10, the step S103 proceeds to a step S104 at which the mobile control section 107 sets a forward transmission power information signal including the fading information signal and the minimum propagation loss base station information signal instead of the mobile transmission user data signal in the mobile encoding section 112 periodically, or when the base station having the minimum propagation loss is changed, or the determined result of the magnitude of the fading is changed. In addition, the mobile control section 107 sets, as an error detection information signal for carrying out error detection in the forward transmission power information signal, a cyclic redundancy check (CRC) information signal in the mobile encoding section 112.

Figures 15A, 15B:
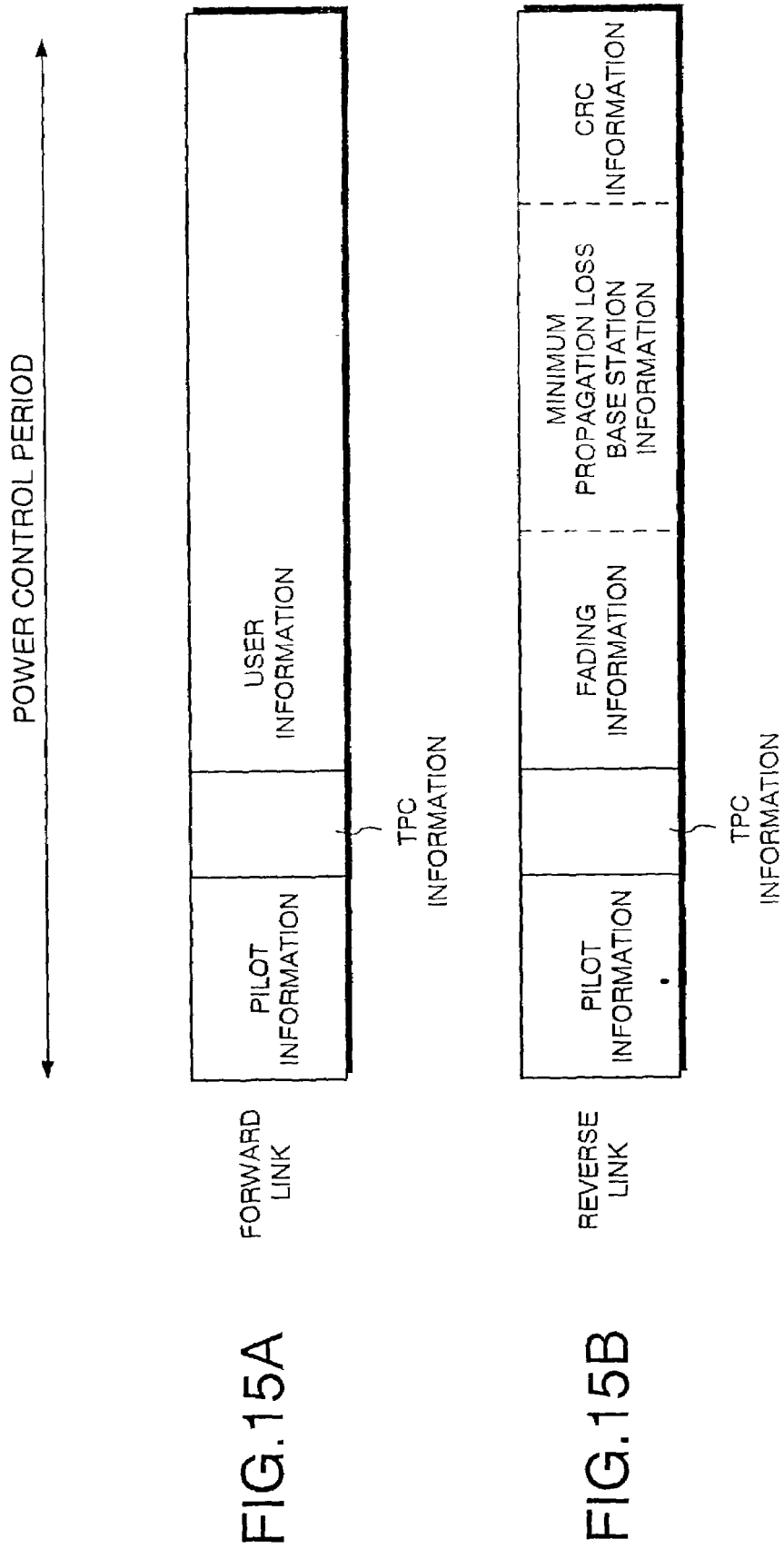
FIGS. 15A and 15B show formats of a forward link and a reverse like, respectively.

FIGS. 15A and 15B show signal formats for the forward link and the reverse link, respectively. As shown in FIG. 15A, the base station 20 transmits a reverse transmission power control information signal including a pilot information signal, a transmission power control (TRC) information signal, and a user information signal to the mobile station 10 via the forward link. As shown in FIG. 15B, the mobile station 10 transmits the forward transmission power control information signal including a pilot information signal, a TRC information signal, the fading information signal, the minimum propagation loss base station information signal, and the CRC information signal to the base station 20 via the reverse link.

Figure 16:
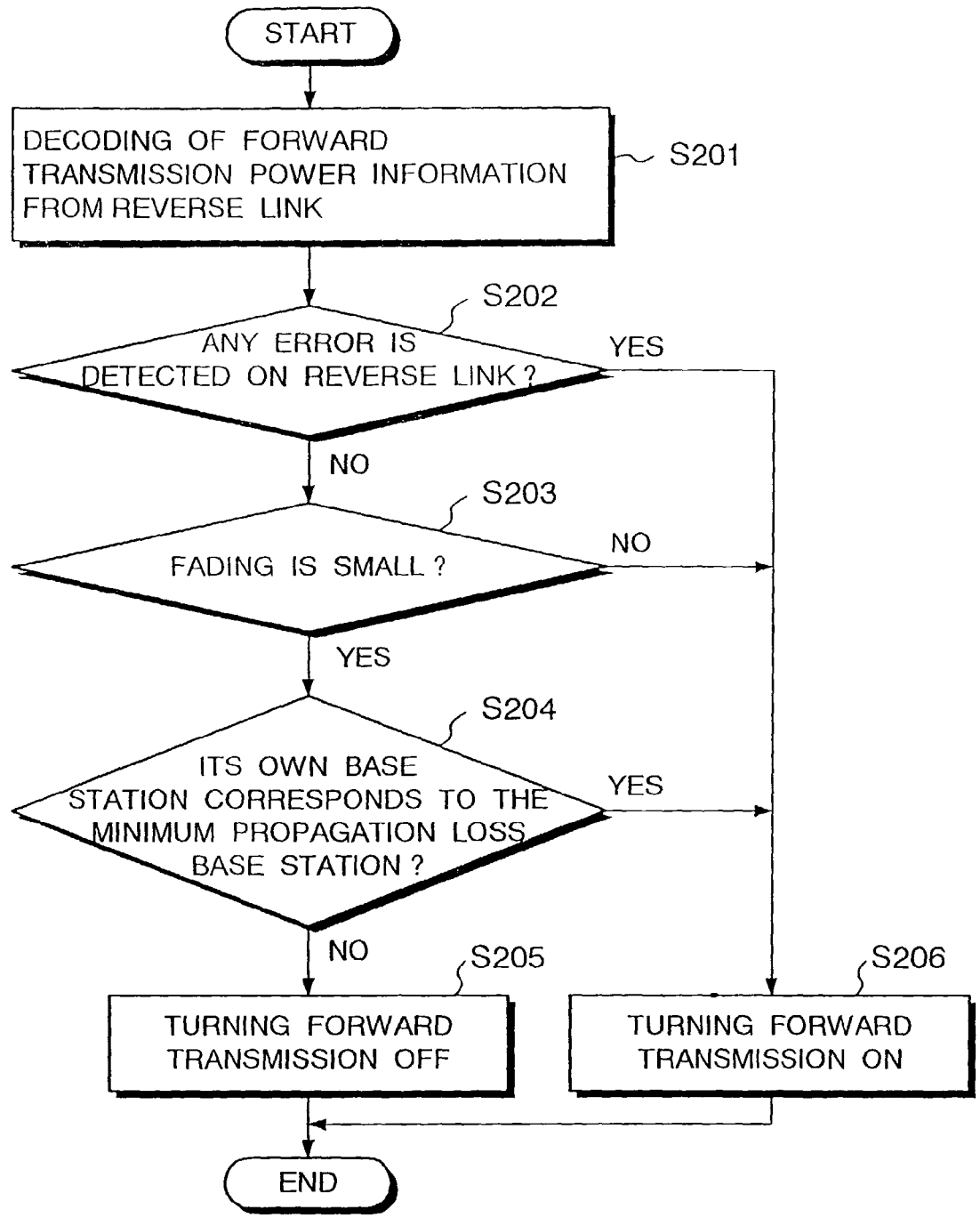
FIG. 16 is a flow chart for use in describing operation of the base station illustrated in FIG. 9.

Referring to FIG. 16 in addition to FIG. 9, the description will proceed to operation of the base station 20 in the CDMA mobile communication system.

At a step S201, the base decoding section 204 decodes the information signal transmitted from the reverse link into a decoded information signal. The decoded information signal is supplied to the base control section 207. When the decoded information signal is the forward transmission power control information signal as shown in FIG. 15B, the base decoding section 204 carries out, using the CRC information signal, an error detection on the fading information signal and the minimum propagation loss base station information signal. An detected result is supplied from the base decoding section 204 to the base control section 207. The step S201 is followed by a step S202 at which the base control section 207 determines whether or not any error is detected on the reverse link on the basis of the detected result. When any error is not detected in the fading information signal and the minimum propagation loss base station by the error detection, the step S202 proceeds to a step S203 at which the base control section 207 determines whether or not the fading indicated by the fading information signal has a magnitude value which is smaller than a predetermined threshold value. When the magnitude value of the fading information signal is smaller than the predetermined threshold value, the step S203 is succeeded by a step S204 at which the base control section 207 determines whether or not its own base station 20 corresponds to the minimum propagation loss base station indicated by the minimum propagation loss base station information signal. When its own base station 20 does not correspond to the minimum propagation loss base station, the step S204 is followed by a step S205 at which the base station section 207 supplies the base transmission power calculating section 211 with the forward transmission on/off instruction signal indicative of turning the forward transmission off. Accordingly, the base station 20 transmits the forward transmission signal.

Otherwise, the steps S202, S203, and S204 proceed to a step S206 at which the base control section 207 supplies the base transmission power calculating section 211 with the forward transmission on/off instruction signal indicative of turning the forward transmission on. Specifically, the base control section 207 supplies the base transmission power calculating section 211 with the forward transmission on/off instruction signal indicative of turning the forward transmission on when any error is detected in the fading information signal and the minimum propagation loss base station by the error detection, when the magnitude value of the fading is not smaller than the predetermined threshold value, or when its own base station 20 corresponds to the minimum propagation loss base station. In this event, the base station 20 transmits the forward transmission signal.

The forward transmission power control method according to the first embodiment of this invention is reliable because the transmission power control for the forward link is carried out by using the information signal indicative of condition of the forward link. However, it is necessary to transmit the forward transmission power information signal from the mobile station 10 to the base station 20 via the reverse link. Accordingly, the format for transmitting the fading information signal and the minimum propagation loss base station information signal as the forward transmission power information signal must coincide with a standardized format.

Figure 17:
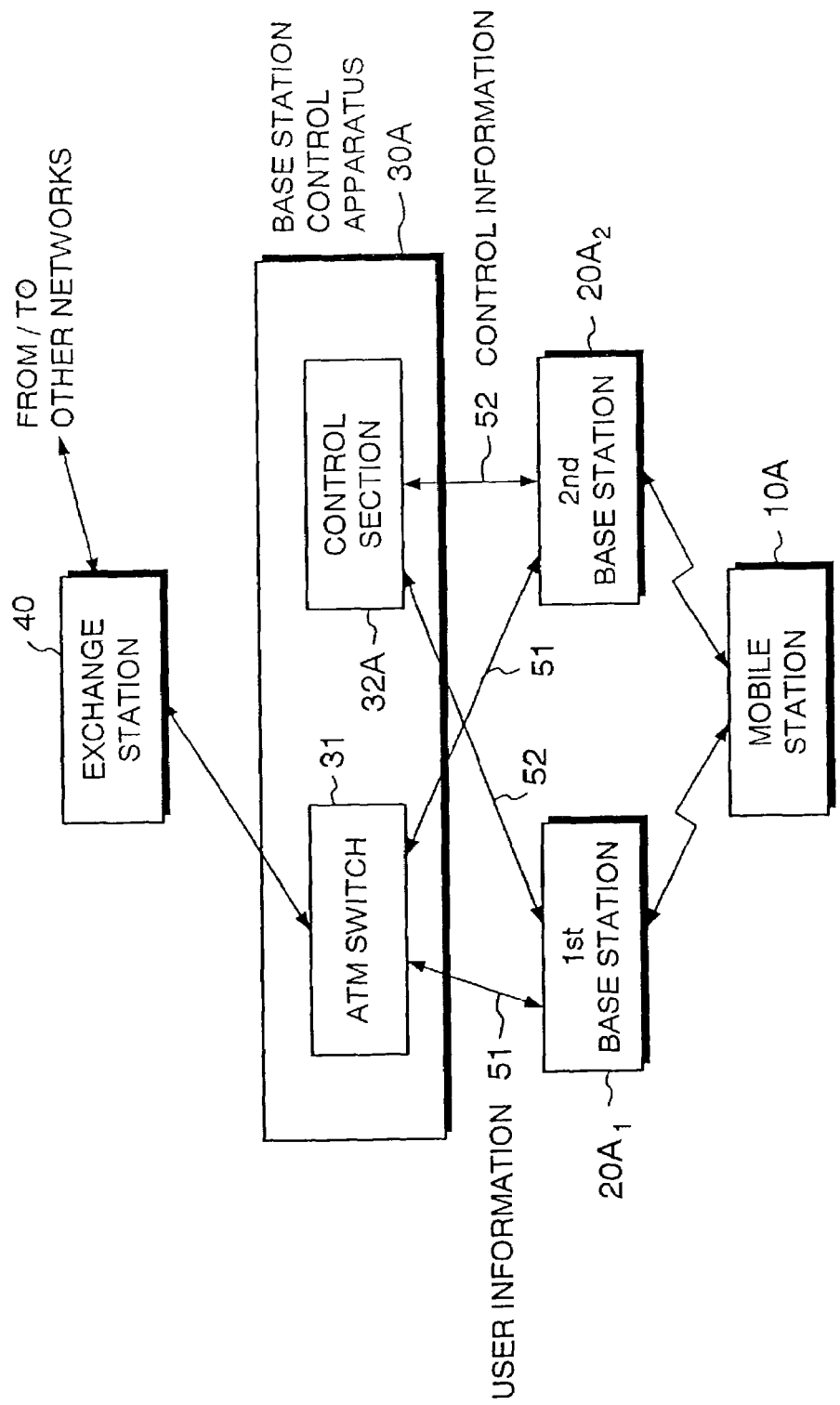
FIG. 17 is a block diagram of a CDMA mobile communication system according to a second embodiment of this invention.

Referring to FIGS. 17 through 21, the description will proceed to a CDMA mobile communication system according to a second embodiment of this invention. FIG. 17 is a block diagram of the CDMA mobile communication system according to the second embodiment of this invention. The illustrated CDMA mobile communication system is similar in structure and operation to the conventional CDMA communication system illustrated in FIG. 1 except that the mobile station, the first and the second base stations, and the base station control apparatus are modified from those illustrated in FIG. 1 as will later become clear. The mobile station, the first and the second base stations, and the base station control apparatus are therefore depicted at 10A, $20A_1$, $20A_2$, and 30A.

Figure 18:
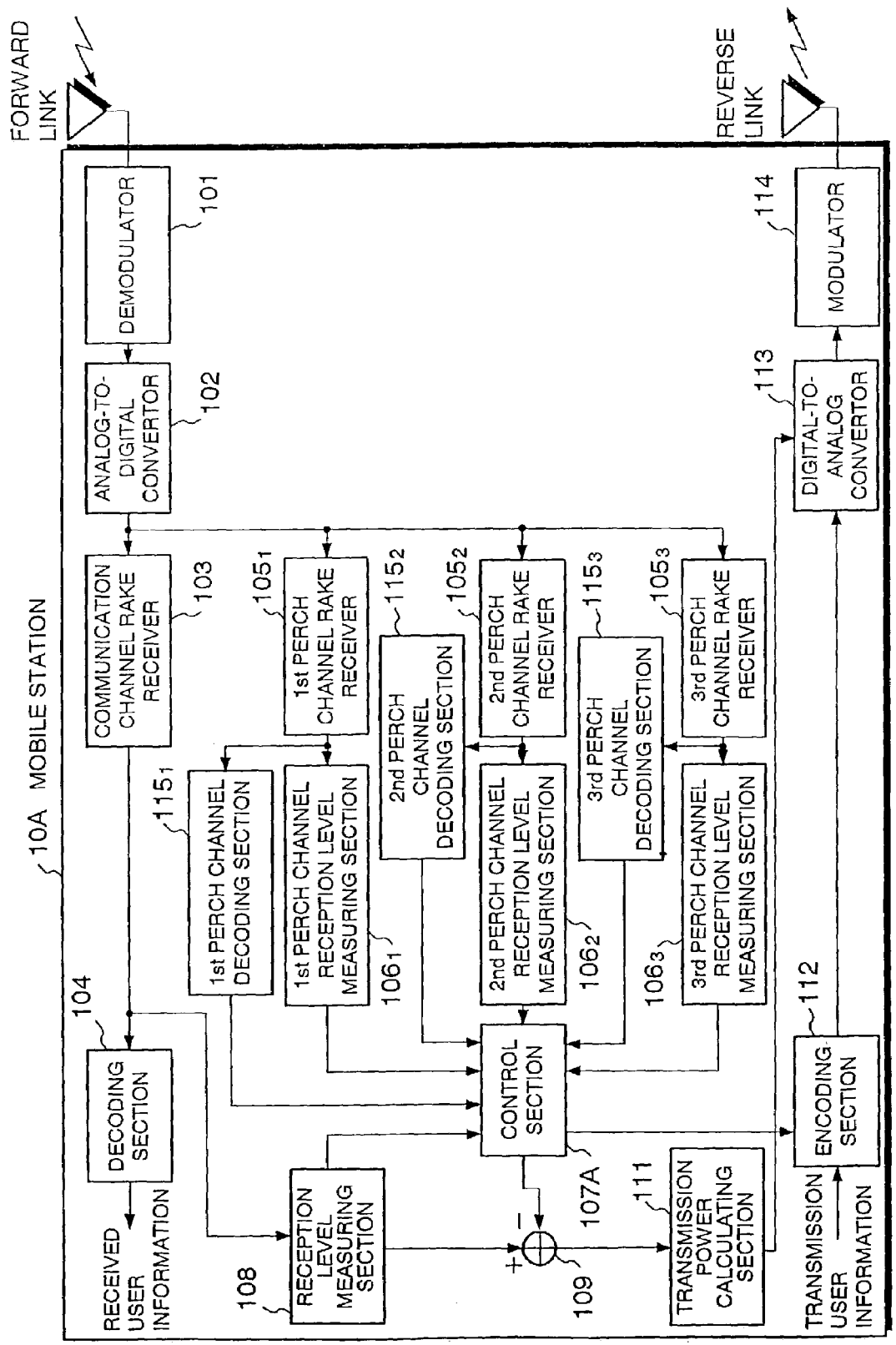
FIG. 18 is a block diagram of a mobile station for use in the CDMA mobile communication system illustrated in FIG. 17.
Figure 19:
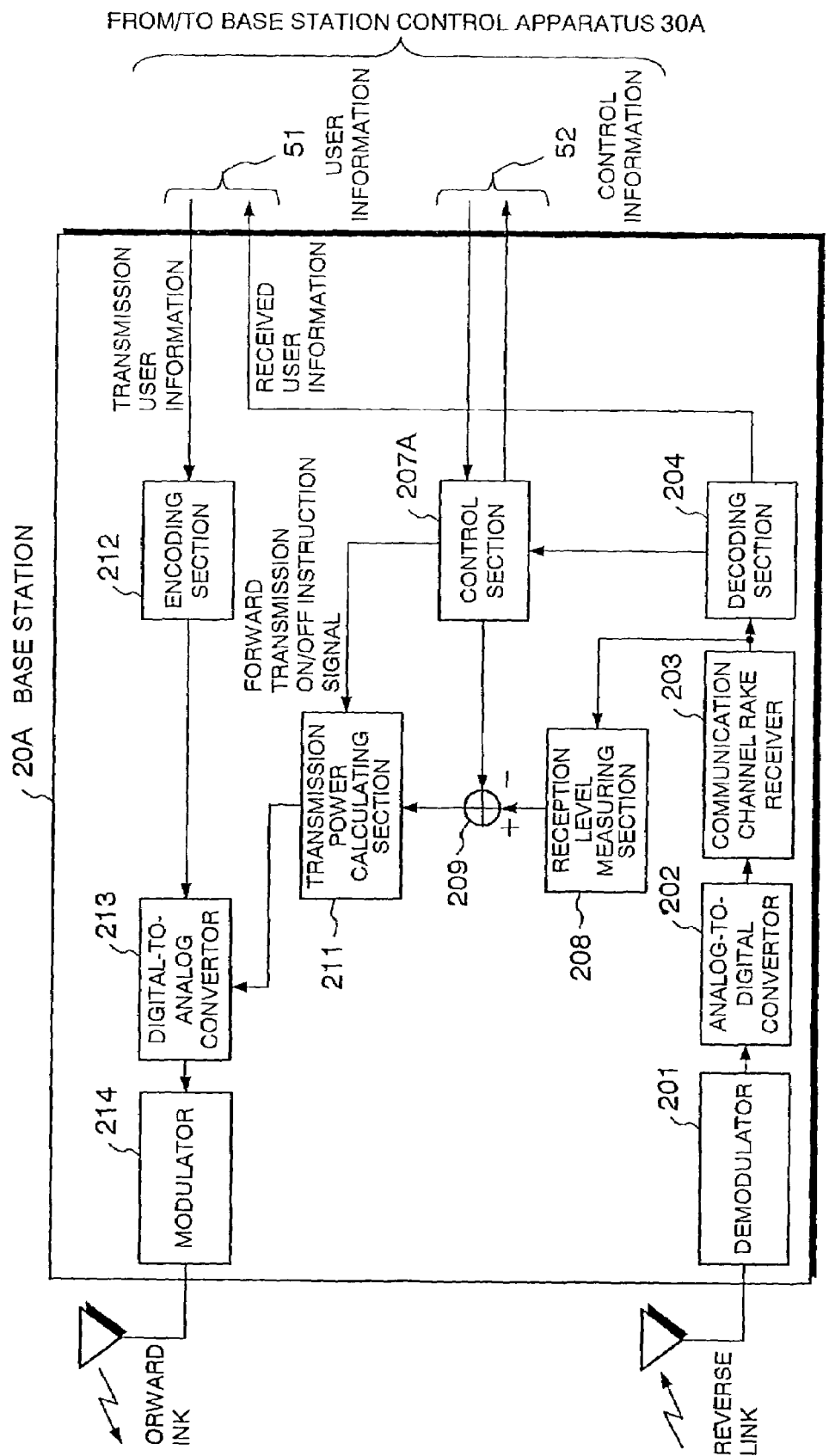
FIG. 19 is a block diagram of a base station for use in the CDMA mobile communication system illustrated in FIG. 17.

FIG. 18 is a block diagram of the mobile station 10A for use in the CDMA mobile communication system illustrated, in FIG. 17 while FIG. 19 is a block diagram of the base station 20A (suffix omitted) for use in the CDMA mobile communication system illustrated in FIG. 17.

As shown in FIG. 18, the illustrated mobile station 10A is similar in structure and operation to the conventional mobile station 10' illustrated in FIG. 2 except that the mobile control section is modified from that illustrated in FIG. 2 as will later become clear. The mobile control section is therefore depicted at 107A.

As shown in FIG. 19, the illustrated base station 20A is similar in structure and operation to the conventional mobile station 20' illustrated in FIG. 3 except that the base control section is modified from that illustrated in FIG. 3 as will later become clear. The base control section is therefore depicted at 207A.

As shown in FIG. 17, the illustrated base station control apparatus 30A is similar in structure and operation to the base station control apparatus 30 illustrated in FIG. 1 except that the control section is modified from that illustrated in FIG. 1 as will later become clear. The control section is therefore depicted at 32A.

In the second embodiment, a combination of the base stations $20A_1$, $20A_2$ and the base station control apparatus 30A determines the magnitude of the fading in the reverse link and the mobile station 10A detects the base station having the minimum propagation loss on the bases of the received power in the perch channel.

Figure 20:
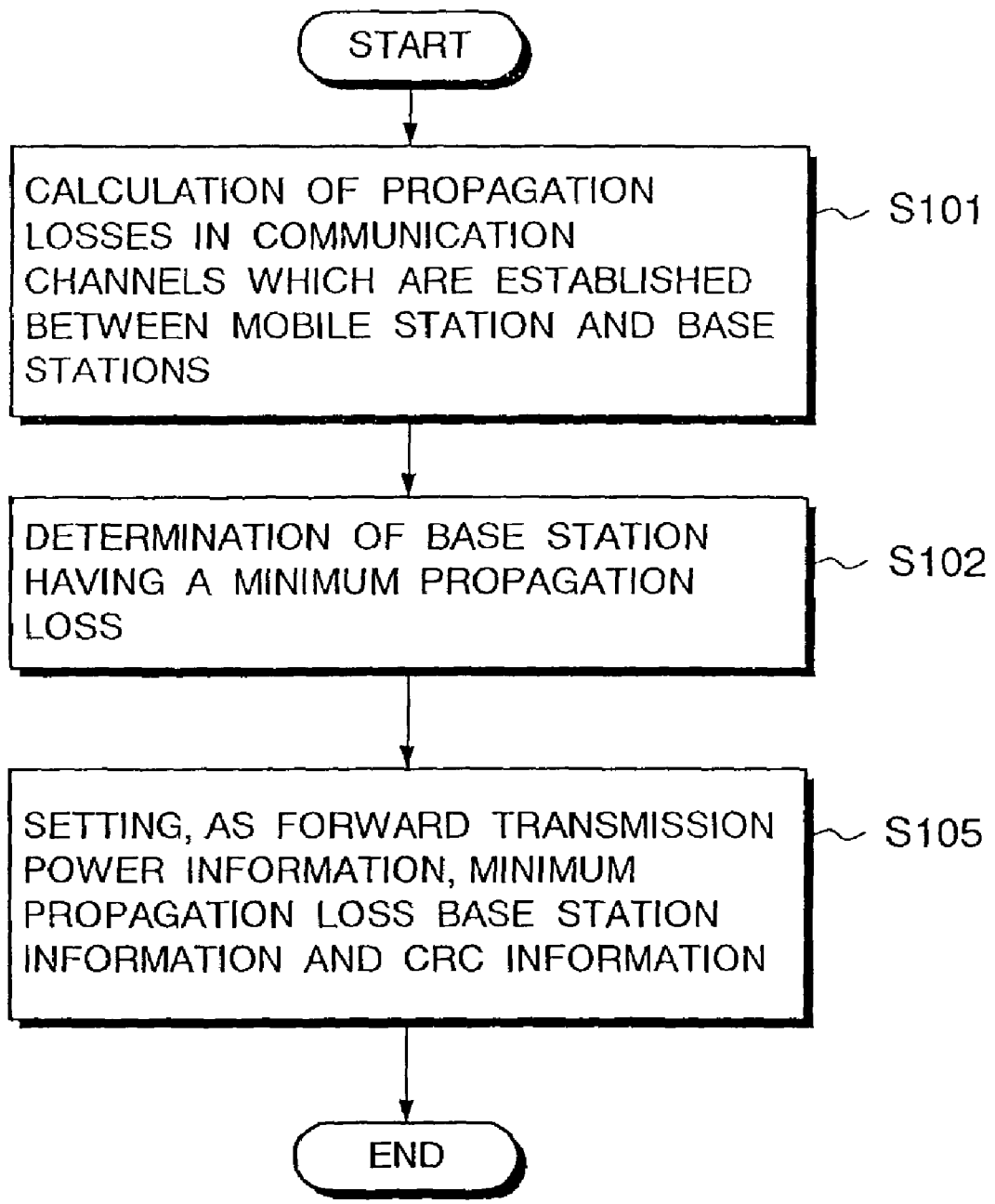
FIG. 20 is a flow chart for use in describing operation of the mobile station illustrated in FIG. 18.

Referring to FIG. 20 in addition to FIG. 18, description will be made as regards operation of the mobile station 10A in the CDMA mobile communication system according to the second embodiment of this invention.

The mobile station 10A is similar in operation to the mobile station 10 illustrated in FIG. 10 except that the step S103 is omitted therefrom and another step S105 is added in lieu of the step S104.

Periodically or when the minimum propagation loss base station is changed, the step S102 is followed by the step S105 at which the mobile control section 107A sets a forward transmission power information signal including the minimum propagation loss base station information signal instead of the mobile transmission user data signal in the mobile encoding section 112. In addition, the mobile control section 107A sets, as an error detection information signal for carrying out error detection in the forward transmission power information signal, a cyclic redundancy check (CRC) information signal in the mobile encoding section 112.

Figure 21:
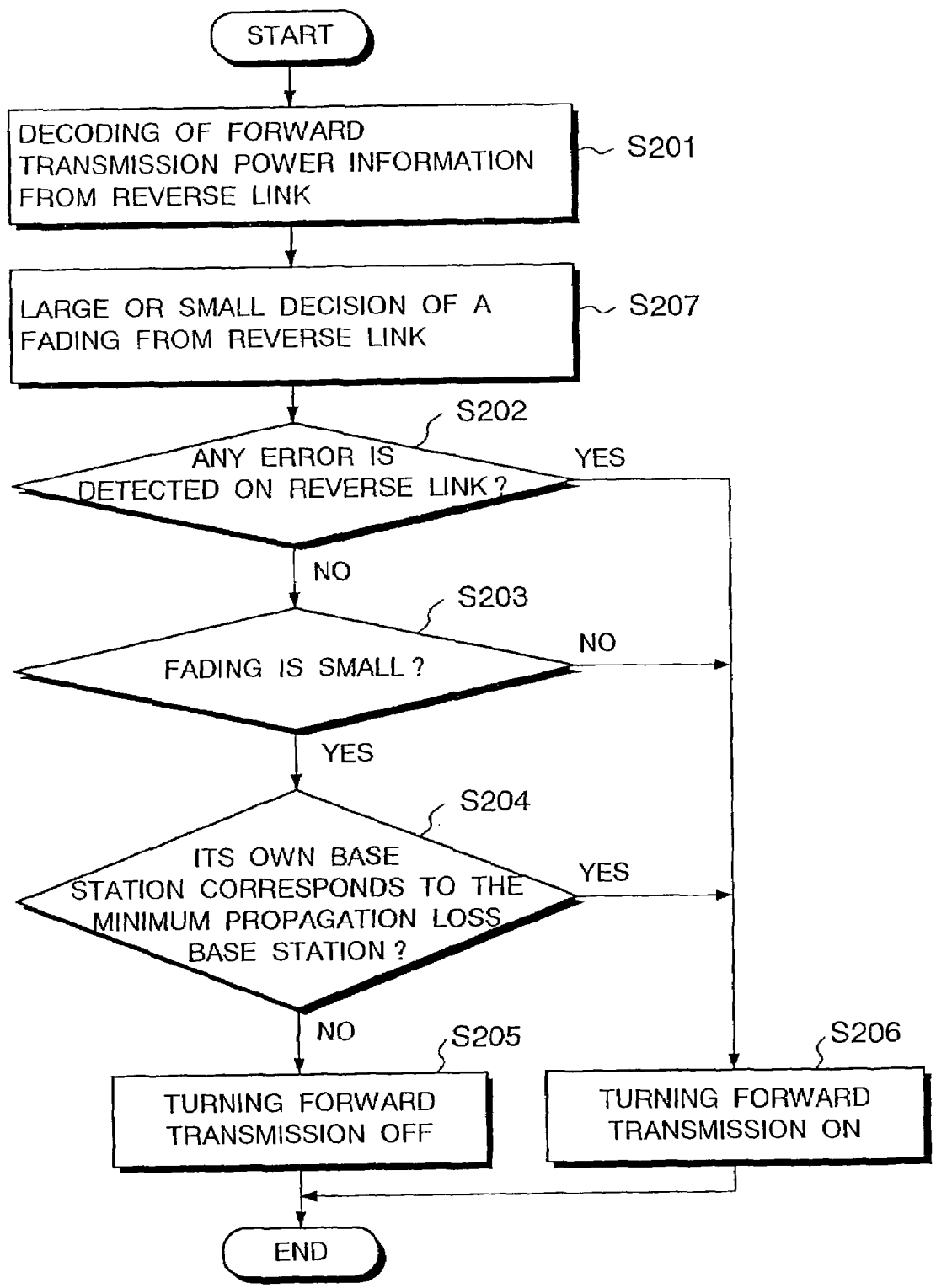
FIG. 21 is a flow chart for use in describing operation of the base station illustrated in FIG. 19.

Referring to FIG. 21 in addition to FIGS. 17 and 19, description will be made as regards operations of the first and the second base stations 20A1 and 20A2 and the base station control apparatus 30A in the CDMA mobile communication system according to the second embodiment of this invention.

Each of the first and the second base stations $20A_1$ and $20A_2$ is similar in operation to the base station 20 illustrated in FIG. 16 except that a new step S207 is inserted between the steps S201 and S202.

At the step S207, the base control section 207A in each of the first and the second base stations $20A_1$ and $20A_2$ carries out a large or small decision of a fading by measuring whether or not a transmission power control error in the reverse link is not less than a predetermined threshold value. The base control section 207A sends a decided result of the fading as the control information signal 52 to a control section 32A of the base station control apparatus 30A.

Specifically, the base control section 207A in the first base station $20A_1$ sends a first decided result of the fading to the control section 32A of the base station control apparatus 30A while the base control section 207A in the second base station $20A_2$ sends a second decided result of the fading to the control section 32A of the base station control apparatus 30A. When any one of the first and the second decided results of the fading indicates that the fading is large, the control section 32A of the base station control apparatus 30A sends its effect to the first and the second base stations $20A_1$ and $20A_2$. When all of the first and the second decided results of the fading indicate the fading is small, the control section 32A of the base station control apparatus 30A sends its effect to the first and the second base stations $20A_1$ and $20A_2$.

The forward transmission power control method according to the second embodiment of this invention is reliable because the transmission power control for the forward link is carried out by using the information signal indicative of condition of the forward link. However, it is necessary to transmit the forward transmission power information signal from the mobile station 10A to the base station 20A via the reverse link. Accordingly, the format for transmitting the minimum propagation loss base station information signal as the forward transmission power information signal must coincide with a standardized format. In addition, an error caused by a difference between a reverse link frequency and a forward link frequency may be included in the fading information signal because the fading information signal is obtained from propagation conditions in the reverse links.

In the second embodiment, each base station sends the large or small decided result of the fading to the base station control apparatus and to turn the forward transmission off may be allowed each base station in a case where its own base station corresponds to the minimum propagation loss base station only when the base station control apparatus determines that the fading is small in all base stations. However, each base station may determine by itself without sending of the large or small decided result of the fading to the base station control apparatus and may turn the forward transmission off when the fading is small and when its own base station does not correspond to the minimum propagation loss base station. In this event, it is possible to rapidly carry out the transmission power control. This is because it is unnecessary to carry out exchange of the control information signal between each base station and the base station control apparatus.

Figure 22:
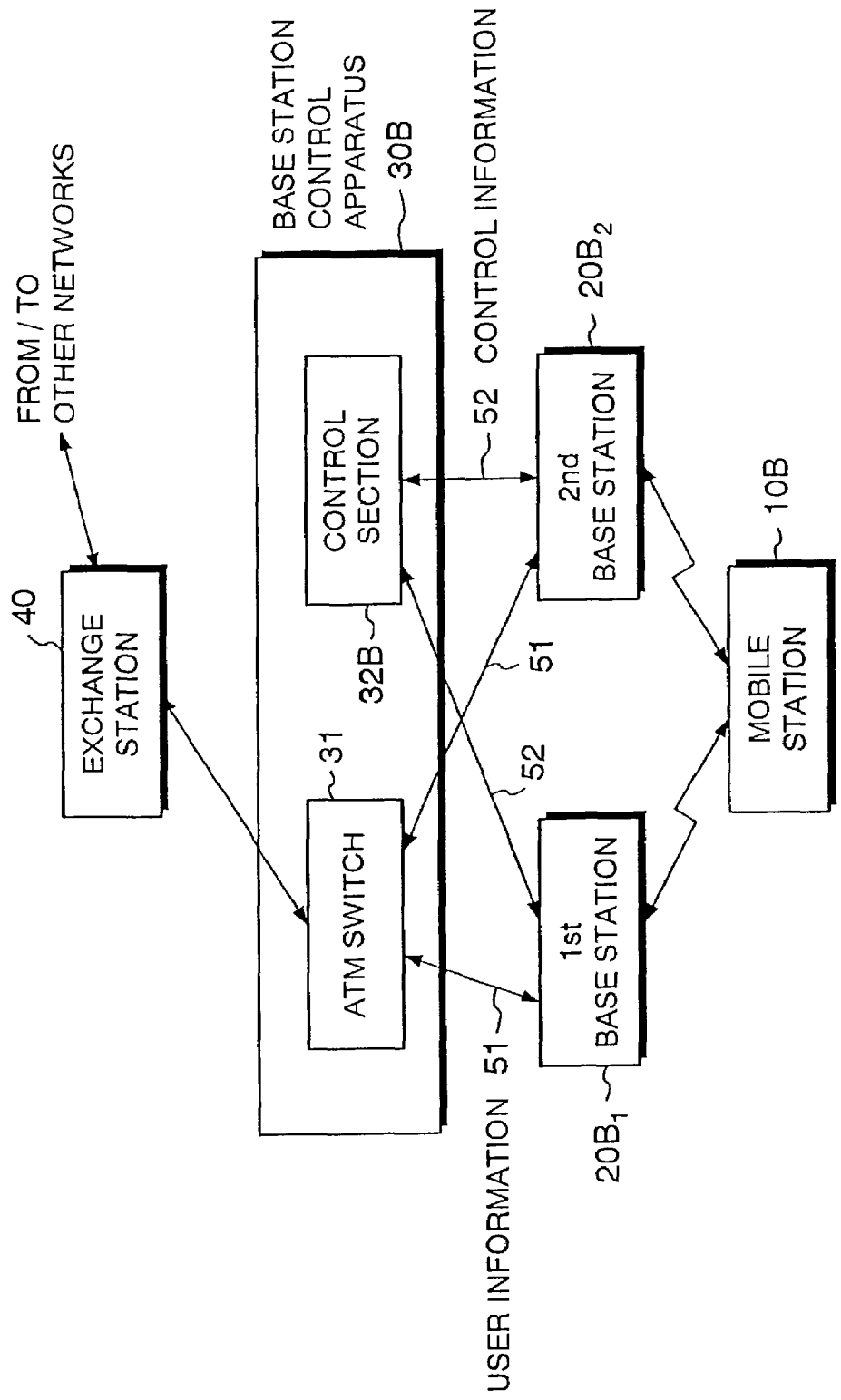
FIG. 22 is a block diagram of a CDMA mobile communication system according to a third embodiment of this invention.

Referring to FIGS. 22 through 26, the description will proceed to a CDMA mobile communication system according to a third embodiment of this invention. FIG. 22 is a block diagram of the CDMA mobile communication system according to the third embodiment of this invention. The illustrated CDMA mobile communication system is similar in structure and operation to the conventional CDMA communication system illustrated in FIG. 1 except that the mobile station, the first and the second base stations, and the base station control apparatus are modified from those illustrated in FIG. 1 as will later become clear. The mobile station, the first and the second base stations, and the base station control apparatus are therefore depicted at 10B, 20B$_1$, 20B$_2$, and 30B.

Figure 23:
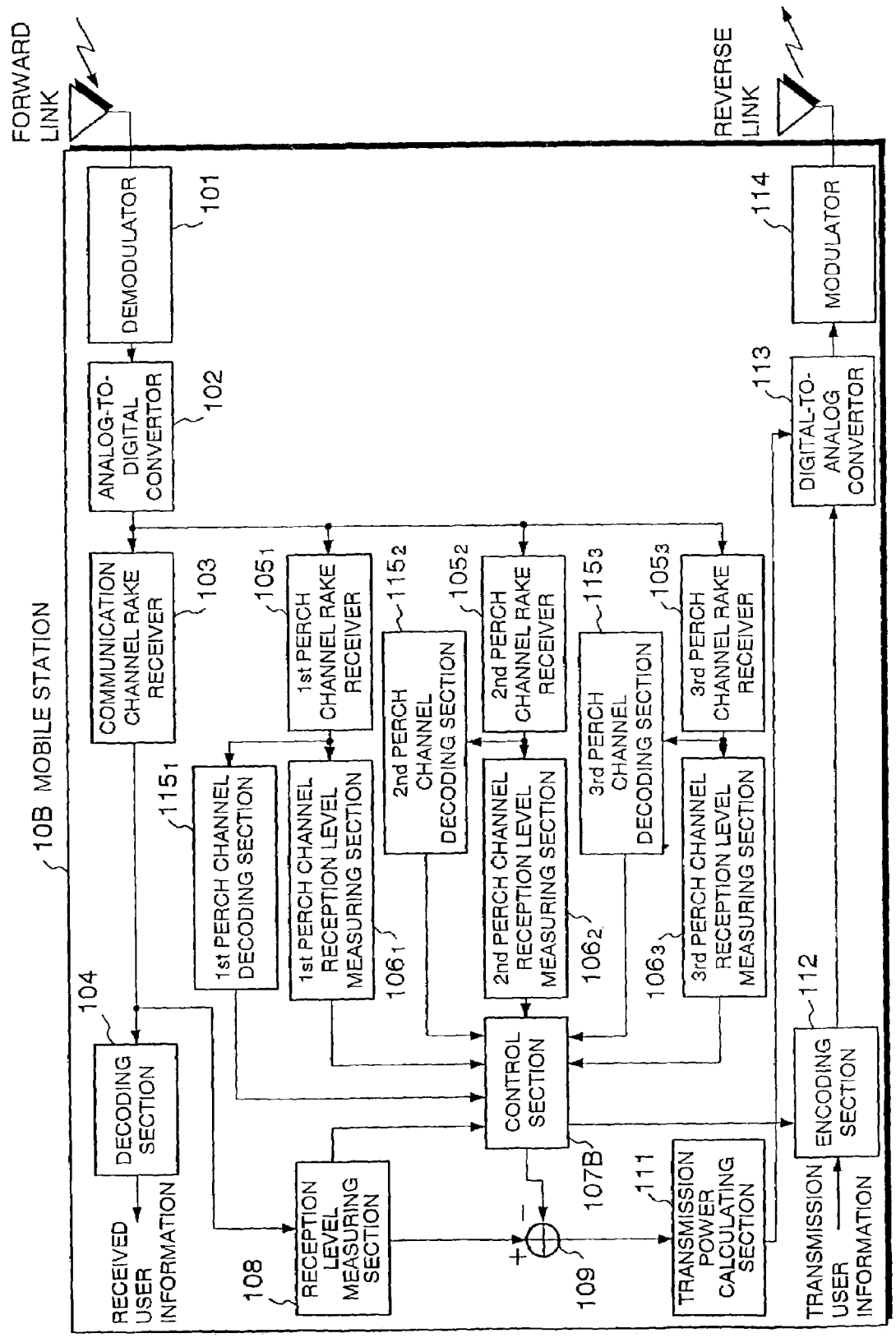
FIG. 23 is a block diagram of a mobile station for use in the CDMA mobile communication system illustrated in FIG. 22.
Figure 24:
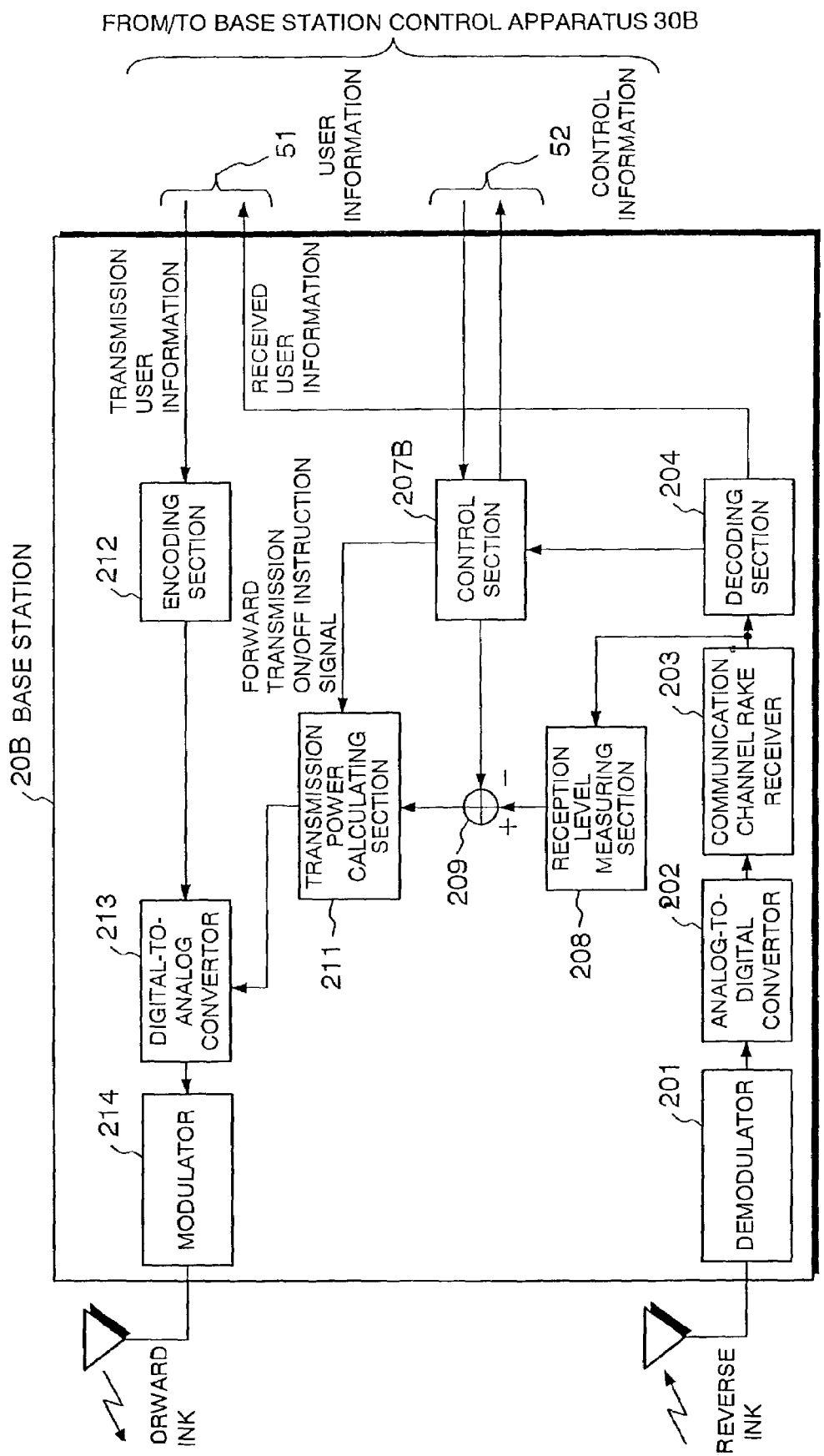
FIG. 24 is a block diagram of a base station for use in the CDMA mobile communication system illustrated in FIG. 22.

FIG. 23 is a block diagram of the mobile station 10B for use in the CDMA mobile communication system illustrated in FIG. 22 while FIG. 24 is a block diagram of the base station 20B (suffix omitted) for use in the CDMA mobile communication system illustrated in FIG. 22.

As shown in FIG. 23, the illustrated mobile station 10B is similar in structure and operation to the conventional mobile station 10 illustrated in FIG. 2 except that the mobile control section is modified from that illustrated in FIG. 2 as will later become clear. The mobile control section is therefore depicted at 107B.

As shown in FIG. 24, the illustrated base station 20B is similar in structure and operation to the conventional mobile station 20' illustrated in FIG. 3 except that the base control section is modified from that illustrated in FIG. 3 as will later become clear. The base control section is therefore depicted at 207B.

As shown in FIG. 22, the illustrated base station control apparatus 30B is similar in structure and operation to the base station control apparatus 30 illustrated in FIG. 1 except that the control section is modified from that illustrated in FIG. 1 as will later become clear. The control section is therefore depicted at 32B.

In the third embodiment, the mobile station 10B determines the magnitude of the fading in the forward link and a combination of the base stations 20B$_1$, 20B$_2$ and the base station control apparatus 30B determines the base station having the minimum propagation loss on the bases of the received power in the perch channel.

Figure 25:
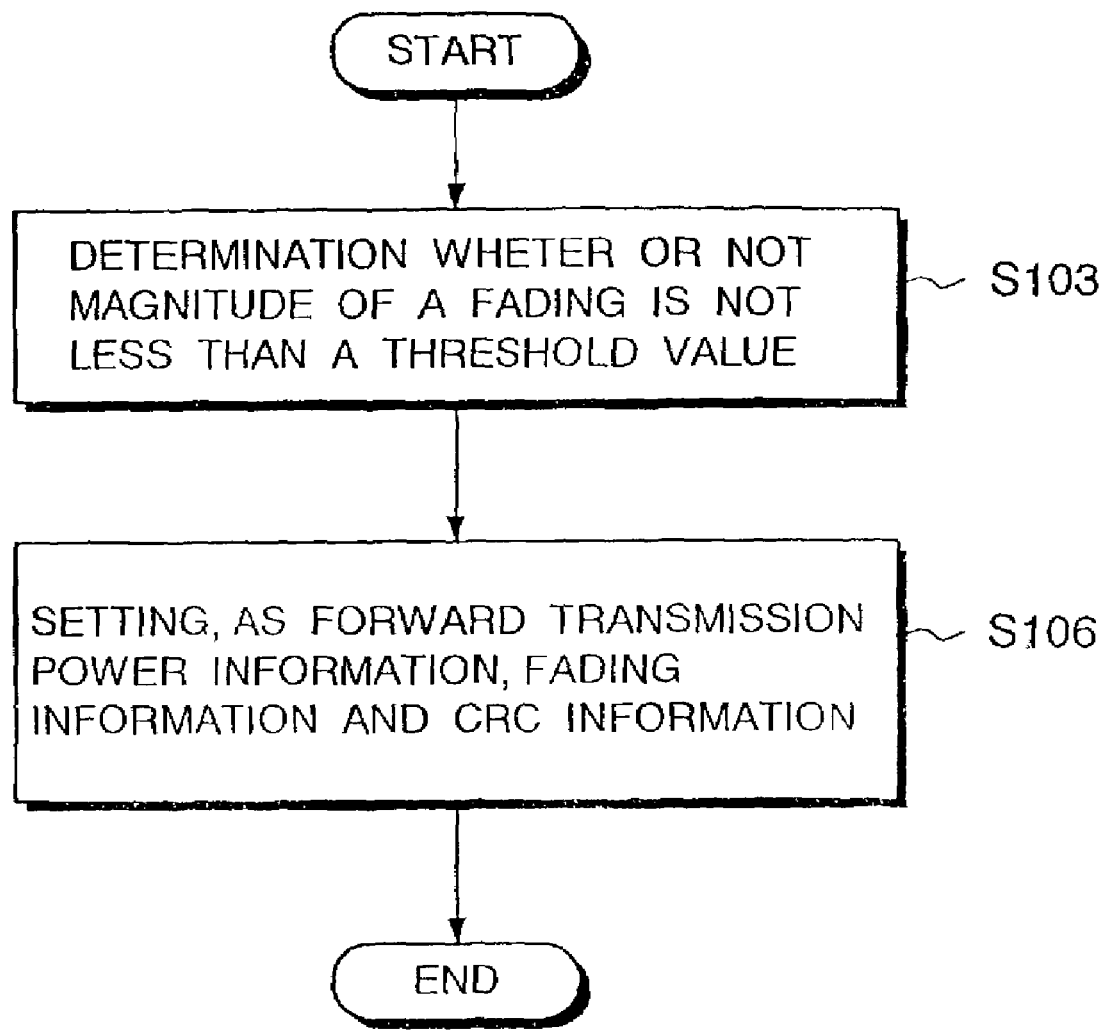
FIG. 25 is a flow chart for use in describing operation of the mobile station illustrated in FIG. 23.

Referring to FIG. 25 in addition to FIG. 23, description will be made as regards operation of the mobile station 10B in the CDMA mobile communication system according to the third embodiment of this invention.

The mobile station 10B is similar in operation to the mobile station 10 illustrated in FIG. 10 except that the steps S101 and S102 are omitted therefrom and another step S106 is added on behalf of the step S104.

Periodically or when the decided result of the magnitude of the fading is changed, the step S103 is followed by the step S106 at which the mobile control section 107B sets a forward transmission power information signal including the fading information signal instead of the mobile transmission user data signal in the mobile encoding section 112. In addition, the mobile control section 107B sets, as an error detection information signal for carrying out error detection in the forward transmission power information signal, a cyclic redundancy check (CRC) information signal in the mobile encoding section 112.

Figure 26:
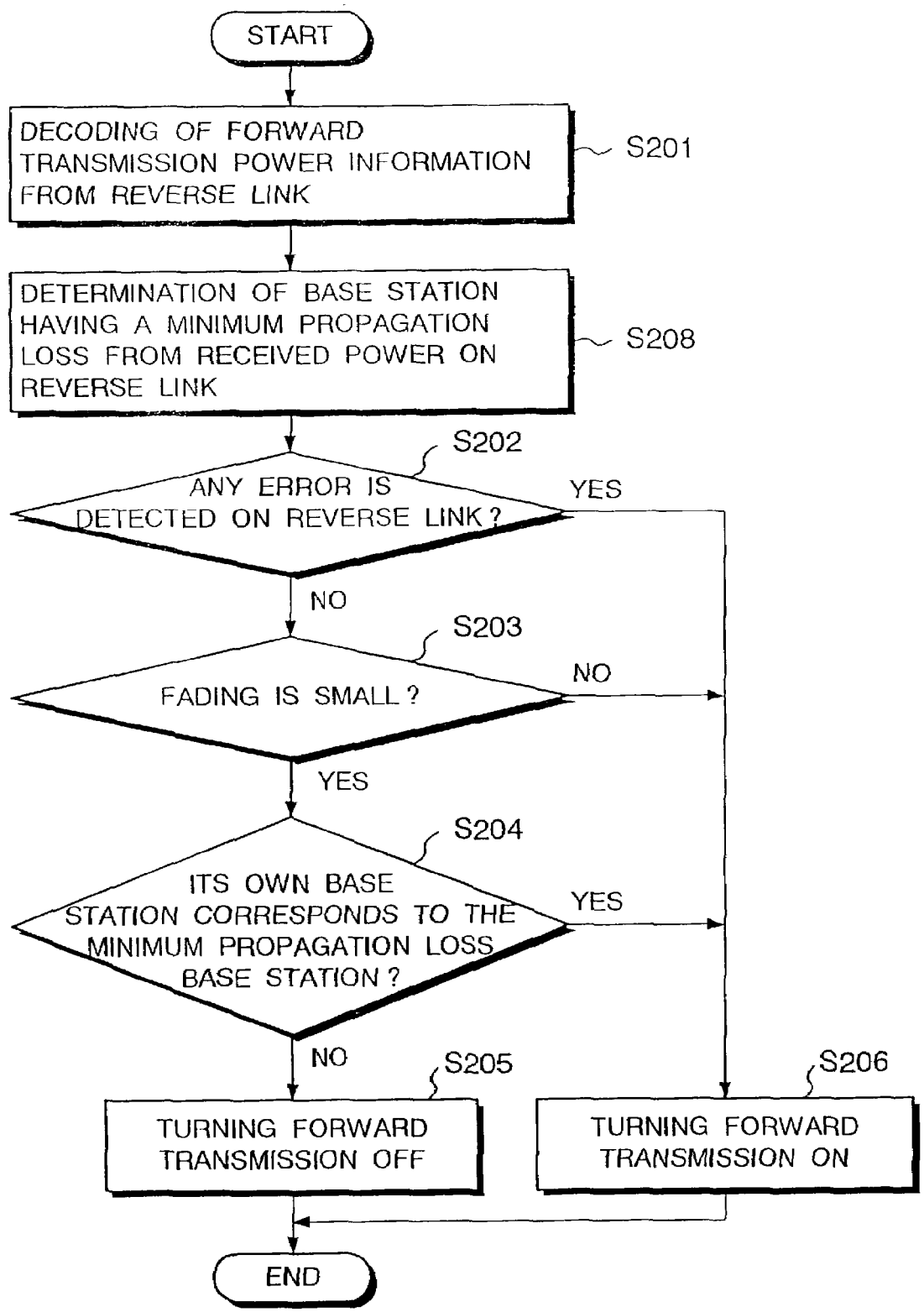
FIG. 26 is a flow chart for use in describing operation of the base station illustrated in FIG. 24.

Referring to FIG. 26 in addition to FIGS. 22 and 24, description will be made as regards operations of the first and the second base stations 20B$_1$ and 20B$_2$ and the base station control apparatus 30B in the CDMA mobile communication system according to the third embodiment of this invention.

Each of the first and the second base stations 20B$_1$ and 20B$_2$ is similar in operation to the base station 20 illustrated in FIG. 16 except that a new step S208 is inserted between the steps S201 and S202.

At the step S208, the base control section 207B in each of the first and the second base stations 20B$_1$ and 20B$_2$ measures a received bit energy-to-interference ratio, Eb/I0, in a communication channel. The base control section 207B sends a received bit energy-to-interference ratio signal indicative of the received bit energy-to-interference ratio Eb/I0 as the control information signal 52 to the control section 32B of the base station control apparatus 30B.

Specifically, the base control section 207B in the first base station 20B$_1$ sends, to the control section 32B of the base station control apparatus 30B, a first received bit energy-to-interference ratio signal indicative of a first received bit energy-to-interference ratio Eb/I0 in a first communication channel between the mobile station 10B and the first base station 20B$_1$. In addition, the base control section 207B in the second base station 20B$_2$ sends, to the control section 32B of the base station control apparatus 30B, a second received bit energy-to-interference ratio signal indicative of a, second received bit energy-to-interference ratio Eb/I0 in a second communication channel between the mobile station 10B and the first base station 20B$_2$. The control section 32B of the base station control apparatus 30B determines, as the minimum propagation loss base station, one of the first and the second base stations 20B$_1$ and 20B$_2$ that has a maximum received bit energy-to-interference ratio by comparing the first and the second received bit energy-to-interference ratios Eb/I0. The control section 32B of the base station control apparatus 30B sends its determined result as the minimum propagation loss base station information signal to the first and the second base stations 20B$_1$ and 20B$_2$.

The forward transmission power control method according to the third embodiment of this invention is reliable because the transmission power control for the forward link is carried out by using the information signal indicative of a condition of the forward link. However, it is necessary to transmit the forward transmission power information signal from the mobile station 10B to the base station 20B via the reverse link. Accordingly, the format for transmitting the fading information signal as the forward transmission power information signal must coincide with a standardized format. In addition, an error caused by a difference between a reverse link frequency and a forward link frequency may be included in the fading information signal because the minimum propagation loss base station information signal is obtained from propagation conditions in the reverse links. Furthermore, a control delay occurs. This is because information signals related to the propagation losses in the communication channels obtained by the base stations are collected in the base station control apparatus, the base station control apparatus determines the minimum propagation loss base station and sends the minimum propagation loss base station information signal to each base station.

Figure 27:
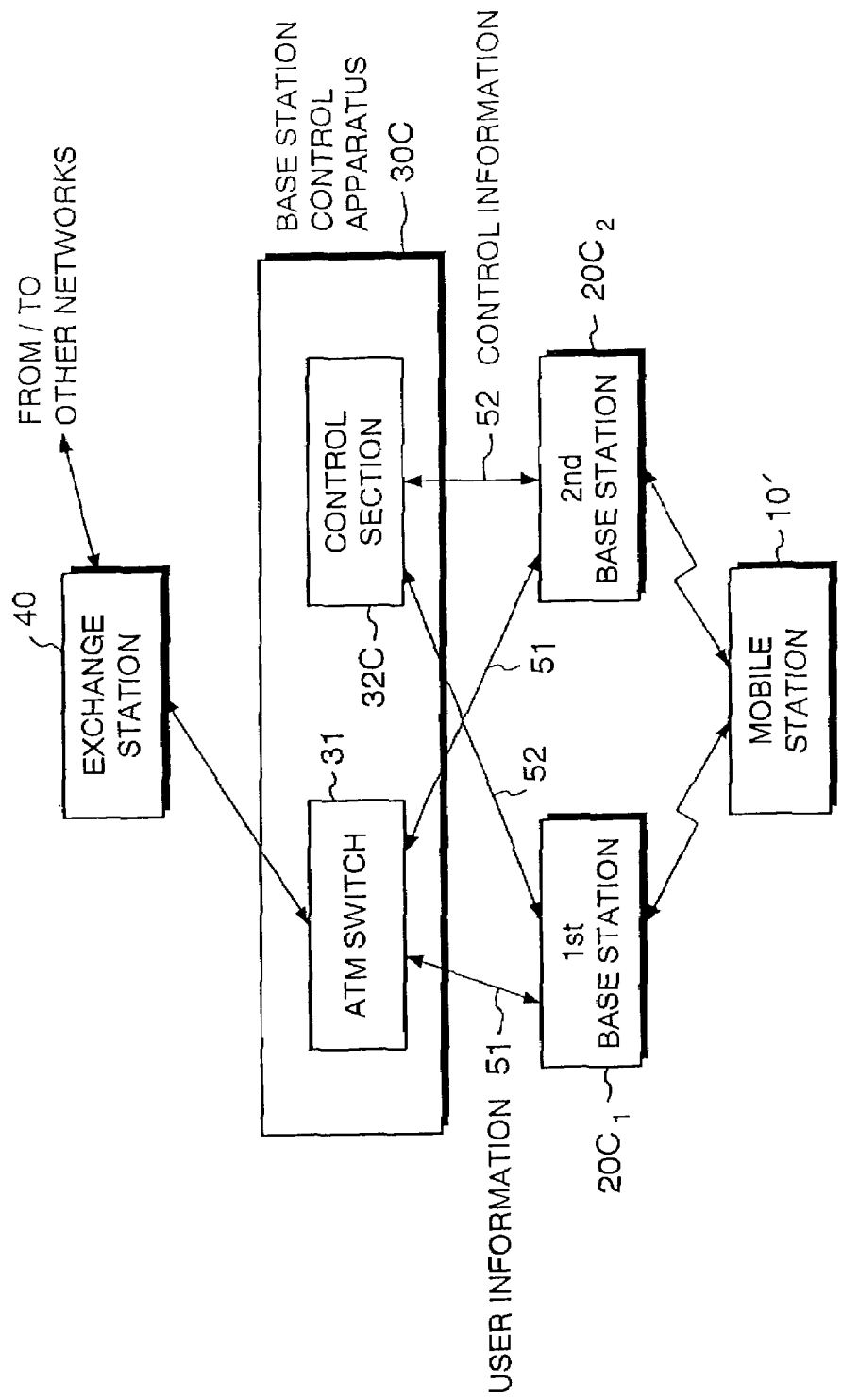
FIG. 27 is a block diagram of a CDMA mobile communication system according to a forth embodiment of this invention.
Figure 28:
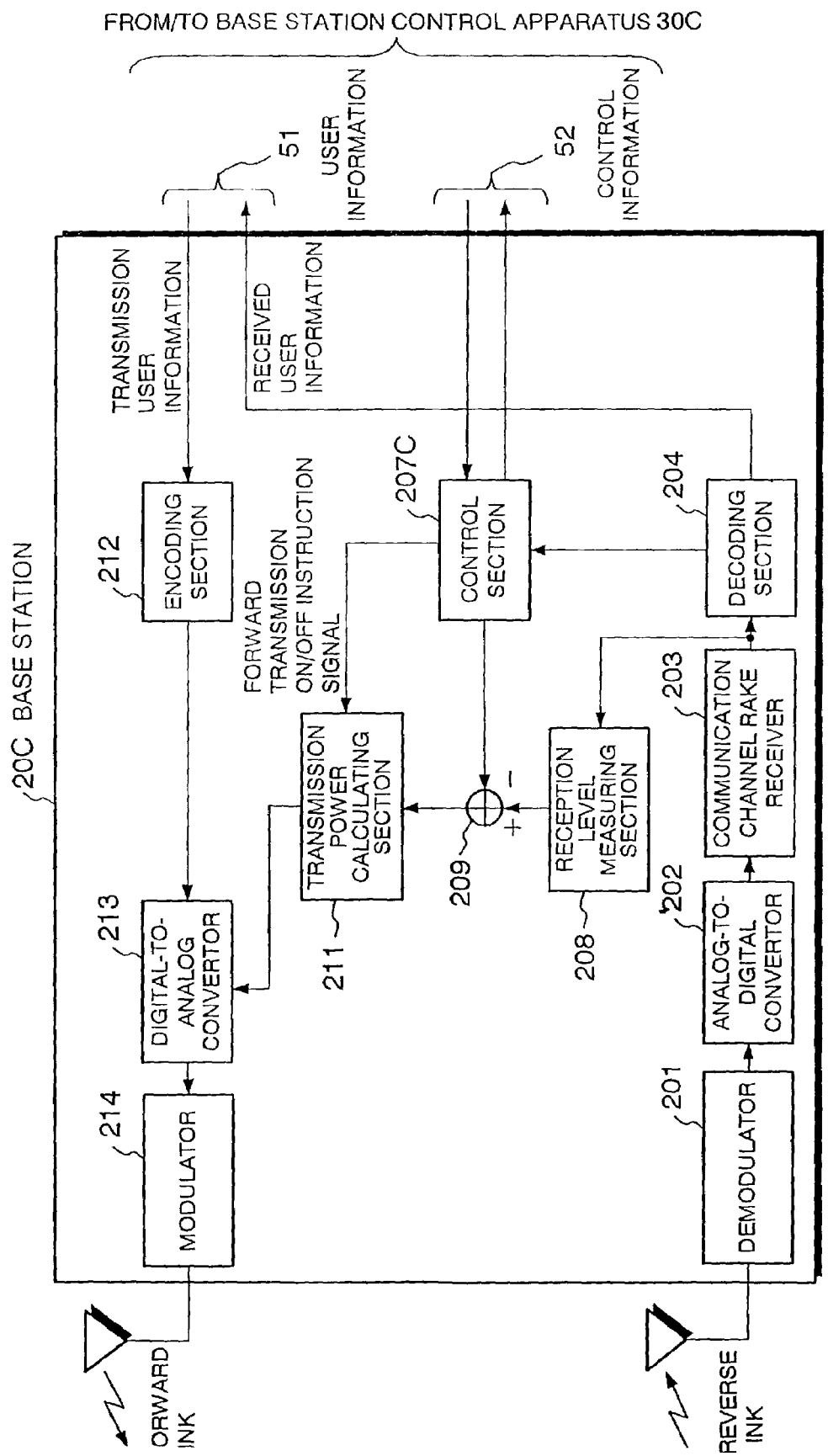
FIG. 28 is a block diagram of a base station for use in the CDMA mobile communication system illustrated in FIG. 27.
Figure 29:
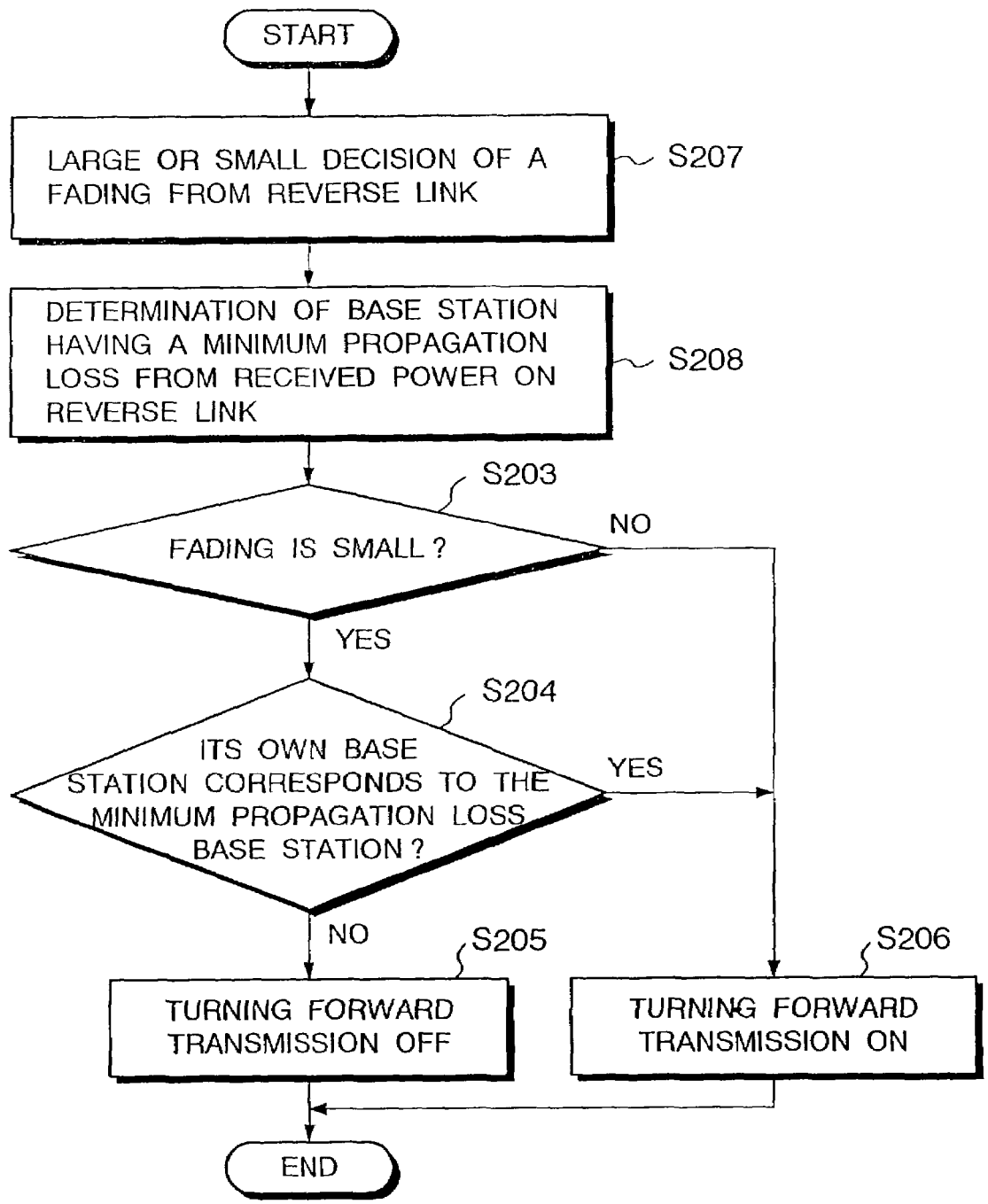
FIG. 29 is a flow chart for use in describing operation of the base station illustrated in FIG. 28.

Referring to FIGS. 27 through 29, the description will proceed to a CDMA mobile communication system according to a fourth embodiment of this invention. FIG. 27 is a block diagram of the CDMA mobile communication system according to the fourth embodiment of this invention. The illustrated CDMA mobile communication system is similar in structure and operation to the conventional CDMA communication system illustrated in FIG. 1 except that the first and the second base stations and the base station control apparatus are modified from those illustrated in FIG. 1 as will later become clear. The first and the second base stations and the base station control apparatus are therefore depicted at 20C$_1$, 20C$_2$, and 30C.

FIG. 28 is a block diagram of the base station 20C (suffix omitted) for use in the CDMA mobile communication system illustrated in FIG. 27.

As shown in FIG. 28, the illustrated base station 20C is similar in structure and operation to the conventional mobile station 20' illustrated in FIG. 3 except that the base control section is modified from that illustrated in FIG. 3 as will later become clear. The base control section is therefore depicted at 207C.

As shown in FIG. 27, the illustrated base station control apparatus 30C is similar in structure and operation to the base station control apparatus 30 illustrated in FIG. 1 except that the control section is modified from that illustrated in FIG. 1 as will later become clear. The control section is therefore depicted at 32C.

In the fourth embodiment, a combination of the base stations $20C_1$, $20C_2$ and the base station control apparatus 30C determines the magnitude of the fading in the reverse link and determines the base station having the minimum propagation loss on the bases of the received power in the reverse link.

Referring to FIG. 29 in addition to FIGS. 27 and 28, description will be made as regards operations of the first and the second base stations $20C_1$ and $20C_2$ and the base station control apparatus 30C in the CDMA mobile communication system according to the fourth embodiment of this invention.

Each of the first and the second base stations $20C_1$ and $20C_2$ is similar in operation to the base station 20 illustrated in FIG. 16 except that the steps S201 and S202 are omitted and the steps S207 and S208 are added.

Inasmuch as the steps S207 and S208 are already described above, description thereof is omitted for the purpose of simplification of description.

In the fourth embodiment, it is unnecessary to change a normal format. This is because it is unnecessary to transmit the forward transmission power information signal from the mobile station 10' to the base station 20C. In addition, an error caused by a difference between a reverse link frequency and a forward link frequency may be included in the minimum propagation loss base station information signal and the fading information signal because the minimum propagation loss base station information signal and the fading information signal are obtained from propagation conditions in the reverse links. Furthermore, a control delay occurs. This is because information signals obtained by the base stations are collected in the base station control apparatus, the base station control apparatus determines the minimum propagation loss base station and a large or small of the fading, and sends the minimum propagation loss base station information signal and the fading information signal to each base station.

In the fourth embodiment, each base station sends the large or small decided result of the fading to the base station control apparatus and to turn the forward transmission off may be allowed each base station in a case where its own base station corresponds to the minimum propagation loss base station only when the base station control apparatus determines that the fading is small in all base stations. However, each base station may determine by itself without sending of the large or small decided result of the fading to the base station control apparatus and may turn the forward transmission off when the fading is small and when its own base station does not correspond to the minimum propagation loss base station. In this event, it is possible to rapidly carry out the transmission power control. This is because it is unnecessary to carry out exchange of the control information signal between each base station and the base station control apparatus.

Referring to FIG. 30, the description will proceed to a CDMA mobile communication system according to a fifth embodiment of this invention. In the CDMA mobile communication system, at least two of the above-mentioned first through fourth embodiments of this invention is combined with one another. Although the above-mentioned first through fourth embodiments of this invention may be operable in each other independently, it is possible for the fifth embodiment of this invention to make variance of a system large by combining the at least two of the above-mentioned first through fourth embodiments of this invention.

FIG. 30 shows differences among the CDMA mobile communication systems according to the first through the fourth embodiments of this invention.

It will be assumed that the first and the fourth embodiments of this invention are combined with each other. Under the circumstances, the mobile station determines the magnitude of the fading on the forward link and determines the minimum propagation loss base station on the basis of the received power on the perch channels. In addition, a combination of the base station and the base station control apparatus determines a large or small magnitude of the fading on the reverse link and determines the minimum propagation loss base station on the basis of the received power on the reverse link. In addition, the combination of the base station and the base station control apparatus carries out on-off control of the forward transmission in the base station on the basis of a plurality of information signals indicative of the magnitude of the fading and of the minimum propagation loss base station.

In this event, it may be possible to use, for instance, three control methods in the manner which will presently be described.

(1) Inasmuch as the base station cannot use the forward transmission power information signal on the reverse link when an error is detected on the reverse link, the base station carries out on-off control of the forward transmission therein using a large or small information signal of the fading and a transmission on-off information signal which are obtained by the combination of the base station and the base station control apparatus.

(2) The base station turns the forward transmission off when both a decided result on the basis of information obtained by the reverse link and a decided result on the basis of information obtained by the combination of the base station and the base station control apparatus indicate turning the forward transmission off.

(3) The base station turns the forward transmission off when either a decided result on the basis of information obtained by the reverse link or a decided result on the basis of information obtained by the combination of the base station and the base station control apparatus indicates turning the forward transmission off.

Although a method of carrying out the forward transmission power control by combining a plurality of information signals such as the fifth embodiment of this invention is disadvantageous in that it is complicated in structure, this method is advantageous in that it is possible to improve reliability in transmission switching control.

Figure 31:
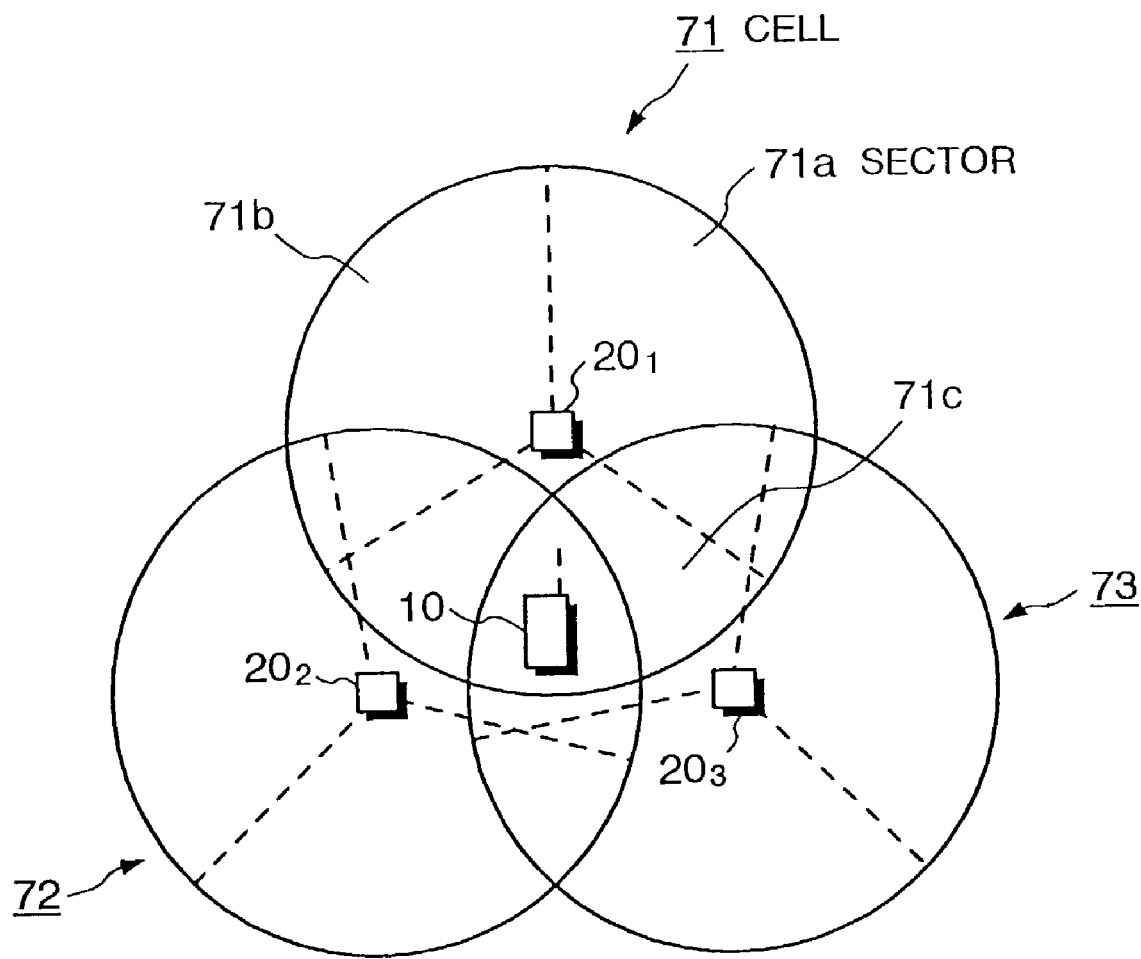
FIG. 31 is a view for use in describing a sectorized CDMA mobile communication system.

Referring to FIG. 31, the description will proceed to a CDMA mobile communication system according to a sixth embodiment of this invention.

In the CDMA mobile communication system, although one base station covers one cell, sectorization of the cell is carried out in order to make capacity of a communication channel larger. The "sectorization" is a method of dividing the cell into a plurality of (e.g. three, six, or the like) areas by making an antenna of the base station have directivity. In addition, the area obtained by dividing the cell is called a sector.

FIG. 31 shows the CDMA mobile communication system where the sectorization is carried out. In FIG. 31, the illustrated CDMA mobile communication system comprises first through third base stations $20_1$, $20_2$, and $20_3$ which cover first through third cells 71, 72, and 73, respectively. In addition, the first cell 71 is divided into three sectors 71a, 71b, and 71c as shown in FIG. 31. Likewise, each of the second and the third cells 72 and 73 is divided into three sectors, as shown in FIG. 31.

In the manner known in the art, the soft handover, which is carried out when the mobile station 10 moves between different sectors, is referred to as a softer handover.

It will be assumed that the mobile station 10 lies in an area in which the first through the third cells 71 to 73 are overlapped in such a sectorized CDMA mobile communication system as illustrated in FIG. 31. In this event, the mobile station 10 may be assigned with eight forward channels when the soft or the softer handover is carried out.

It will be presumed that the forward transmission power control methods according to the above-mentioned first through fifth embodiments are applied to the sectorized CDMA mobile communication system. In a conventional forward transmission power control method, other seven channels other than one channel are put into a transmission off state when the soft or the softer handover is carried out using the eight forward channels. However, a difference is too large between that the handover is carried out using the eight forward channel and that only one forward channel is used. Accordingly, a case where degradation of a service quality cannot be accepted may occurs although the fading is small.

In order to resolve the above-mentioned problem, the forward transmission power control method according to the sixth embodiment of this invention controls so that all of the base stations, each of which has the propagation loss in the communication channel not more than a predetermined value, turn the forward transmission on without turning the forward transmission in only one base station having a minimum propagation loss on. In addition, the forward transmission power control method according to the sixth embodiment of this invention controls so that only the base station having the minimum propagation loss turns the forward transmission on when all base stations have the propagation losses which are more than the predetermined value.

By carrying out such a control, at least one base station turns the forward transmission on and a plurality of base stations having a small propagation loss normally turn the forward transmission on. As a result, it is possible for the sixth embodiment of this invention to restrain the degradation of the service quality to the minimum.

In the CDMA mobile communication systems according to the above-mentioned first through sixth embodiments of this invention, on-off control of the forward transmission power may be carried out every frame or may be carried out every slot.

While this invention has thus far been described in conjunction with a few preferred embodiments thereof, it will now be readily possible for those skilled in the art to put this invention into various other manners. For example, by using the received power level in lieu of the propagation loss, a determination of the base station may be carried out which has the best channel for the mobile station although each of the above-mentioned first through sixth embodiments of this invention determines the propagation losses of the communication channels and carries out the forward transmission power control so that the channel between the mobile station and the base station having the minimum propagation loss is the best channel. In this event, of course, the determination is made so that the base station having a maximum received power level is the base station having the best channel.

Furthermore, in the above-mentioned first through sixth embodiments of this invention, on carrying out the soft handover or the softer handover, the communication capacity of the forward channel is decreased so that only the base station having the minimum propagation loss in the communication channel for the mobile station communicates with the mobile station as the minimum propagation loss base station and other base stations turn the forward transmission off. However, this invention is not restricted to such a control. For example, it is possible to decrease the communication capacity of the forward channel by carrying out control so as to lower the transmission power in the forward transmission from an original value without perfectly turning the forward transmission off in the other base stations except for the minimum propagation loss base station.

What is claimed is:

1. A method of controlling communication in a code division multiple access (CDMA) mobile communication system, in which a mobile station performs soft handover with plural base stations, comprising:

monitoring reception quality of signals, in said mobile station, from the plural base stations that are in the soft handover state;

comparing said reception quality of signals from respective base stations in said mobile station;

determining a specific base station based on a result of said monitoring reception quality in said mobile station;

transmitting information about said specific base station from said mobile station to said plural base stations;

receiving the information about said specific base station in said plural base stations; and determining, in each of said plural base stations, whether to turn off a forward transmission based on said information about said specific base station and a magnitude of fading in communication channels between said mobile station and each of plural base stations.

2. The method as claimed in claim 1, wherein each of said base stations turns off said forward transmission if said magnitude of said fading is smaller than a predetermined value.

3. A code division multiple access (CDMA) mobile communication systems in which a mobile station performs soft handover with plural base stations, said mobile station comprising:

monitoring means for monitoring reception quality of signals from the plural base stations that are in the soft handover state;

base station specifying means for determining a specific base station based on said reception quality; and transmitting means for transmitting information about said specific base station to said plural base stations;

said base stations each comprising:

receiving means for receiving the information about said specific base station; and transmission control means for determining whether to turn off a forward transmission based on said information about said specific base station and a magnitude of fading in communication channels between said mobile station and each of said plural base stations.

4. The system as claimed in claim 3, wherein said transmission control means turns off said forward transmission if said magnitude of said fading is smaller than a predetermined value.

5. A mobile station for a code division multiple access (CDMA) mobile communication system, in which said mobile station performs soft handover with plural base stations, said mobile station comprising:

monitoring means for monitoring reception quality of signals from the plural base stations that are in the soft handover state;

base station specifying means for determining a specific base station based on said reception quality; and transmitting means for transmitting information about said specific base station to said plural base stations and information about a magnitude of fading in communication channels between said mobile station and said plural base stations, wherein said specific base station determines whether to turn off a forward transmission based on said information about said specific base station and a magnitude of fading in communication channels between said mobile station and each of said plural base stations.

6. A base station for a code division multiple access (CDMA) mobile communication system, in which a mobile station performs soft handover with plural base stations, said base station comprising:

receiving means for receiving from said mobile station information about specific base station specified based on reception quality at said mobile station; and transmission control means for determining whether to turn off a forward transmission based on said information about said specific base station and a magnitude of fading in communication channel between said mobile station and said base station.

* * * * *

UNITED STATES PATENT AND TRADEMARK OFFICE
CERTIFICATE OF CORRECTION

PATENT NO. : 7,532,888 B2
APPLICATION NO. : 10/307359
DATED : May 12, 2009
INVENTOR(S) : Takayuki Kondo It is certified that error appears in the above-identified patent and that said Letters Patent is hereby corrected as shown below:

On the title page, item [73]:
Assignee, delete "Nec" insert --NEC--;

Column 28, line 63, delete "a," insert --$a_1$--.

Signed and Sealed this

Sixth Day of October, 2009

David J. Kappos
*Director of the United States Patent and Trademark Office*